United States Patent
Kohashi et al.

(10) Patent No.: US 6,678,873 B1
(45) Date of Patent: Jan. 13, 2004

(54) METHOD OF DESIGNING SEMICONDUCTOR INTEGRATED CIRCUIT DEVICE

(75) Inventors: Yasuo Kohashi, Fukuoka (JP); Kenichi Ishida, Fukuoka (JP); Masatoshi Matsuo, Fukuoka (JP); Tosihiro Moriiwa, Fukuoka (JP); Hitoshi Fujimoto, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 138 days.

(21) Appl. No.: 09/713,340

(22) Filed: Nov. 16, 2000

(30) Foreign Application Priority Data

Nov. 16, 1999 (JP) .......................... 11-325077

(51) Int. Cl.$^7$ ............................. G06F 17/50
(52) U.S. Cl. .................. 716/11; 716/7; 716/8
(58) Field of Search .................. 716/11, 1, 2, 4, 716/5, 6, 7, 8

(56) References Cited

U.S. PATENT DOCUMENTS

| | | | | |
|---|---|---|---|---|
| 5,031,111 A | * | 7/1991 | Chao et al. ................ 716/10 |
| 5,197,016 A | * | 3/1993 | Sugimoto et al. ........... 716/11 |
| 5,428,754 A | * | 6/1995 | Baldwin .................... 712/220 |
| 5,553,002 A | * | 9/1996 | Dangelo et al. ............. 716/11 |
| 5,666,289 A | * | 9/1997 | Watkins ....................... 716/8 |
| 5,768,145 A | | 6/1998 | Roethig |
| 5,870,588 A | | 2/1999 | Rompaey et al. |
| 5,883,814 A | | 3/1999 | Luk et al. |
| 6,150,841 A | * | 11/2000 | Agrawal et al. .............. 326/39 |

FOREIGN PATENT DOCUMENTS

| | | |
|---|---|---|
| JP | 6-332971 | 12/1994 |
| JP | 7-253998 | 10/1995 |
| JP | 9-91335 | 4/1997 |

* cited by examiner

*Primary Examiner*—Leigh M. Garbowski
*Assistant Examiner*—Brandon Bowers
(74) *Attorney, Agent, or Firm*—McDermott, Will & Emery

(57) ABSTRACT

In the case of using a database storing therein data on a plurality of circuits which are different in parameters such as circuit scale, memory capacity, number of pins, and operating frequency, the respective parameters of the circuits are analyzed automatically and a semiconductor integrated circuit device is designed automatically in accordance with the result of the analysis such that specifications required thereof are satisfied. For processor circuits, a micro-code and the like are analyzed automatically such that the processor circuits are improved or integrated. In the case of using block function IPs containing operations and circuit elements, a database storing therein IPs in a hierarchical configuration is used and a connecting portion between the internal functions of the IPs is withdrawn to the outside of the IPs, whereby a new IP or system is constructed.

1 Claim, 33 Drawing Sheets

Fig. 3(a)

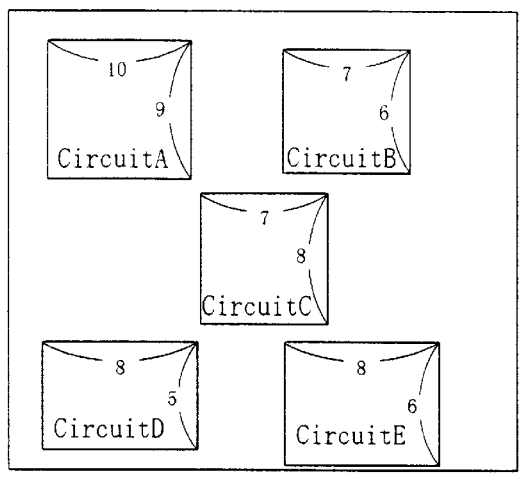

- LSIs Used in System
  A: 10mm × 9mm = 90mm$^2$
  B: 7mm × 6mm = 42mm$^2$
  C: 7mm × 8mm = 56mm$^2$
  D: 8mm × 5mm = 40mm$^2$
  E: 8mm × 6mm = 48mm$^2$ Fig. 3(b)  Combination 1. A10 × 9 = 90mm$^2$
Combination 2. B7 × 6 = 42 + D8 × 5 = 40 = 82mm$^2$
Combination 3. C7 × 8 = 56 + E8 × 6 = 48 = 104mm$^2$

Fig. 3(c)

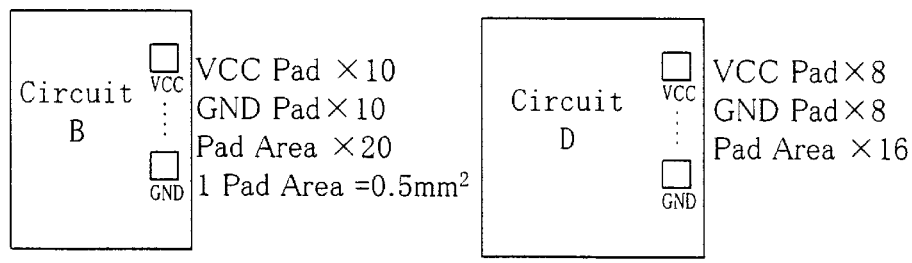

Circuit B: VCC Pad × 10, GND Pad × 10, Pad Area × 20, 1 Pad Area = 0.5mm$^2$

Circuit D: VCC Pad × 8, GND Pad × 8, Pad Area × 16

Fig. 3(d)

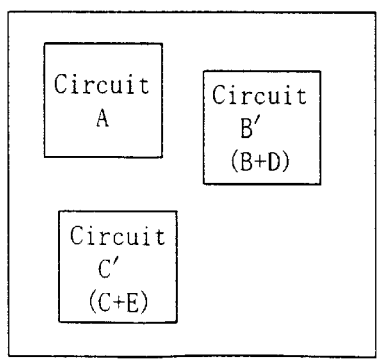

A: 10mm × 9mm = 90mm$^2$ (No Change)
B': B + D = 82mm$^2$ − 6 mm$^2$ (Area Reduction by Pad Sharing)
C': C + E = 104mm$^2$ − 8 mm$^2$ (Area Reduction by Pad Sharing)

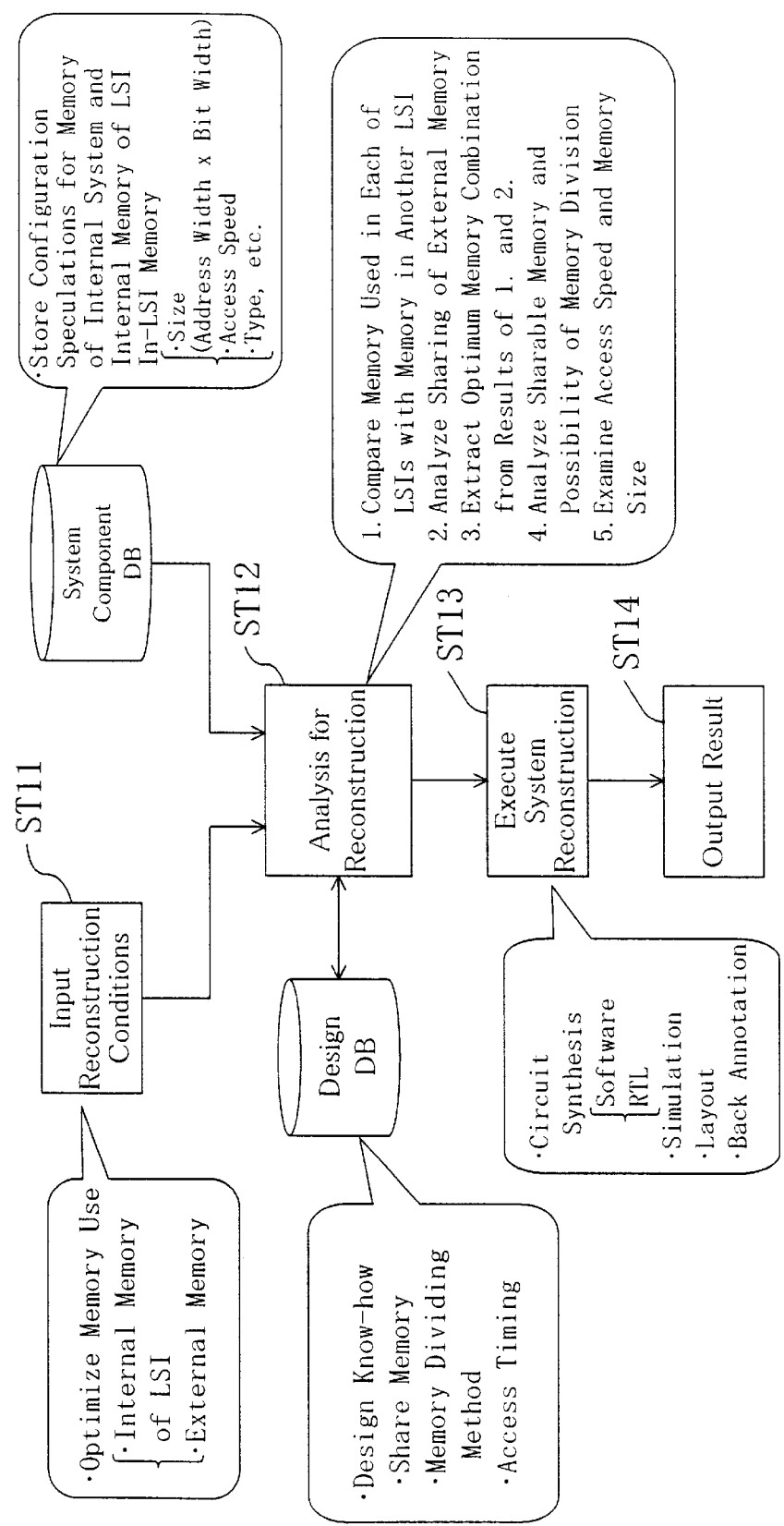

Memory Number
1···SRAM 8bit×1024byte······Embedded in LSI A
    Access Time 20ns
2···SRAM 8bit× 512byte······Embedded in LSI B
    Access Time 30ns
3···ROM 16bit×2048byte······Memory Chip
4···ROM 16bit× 512byte······Embedded in LSI C
5···SRAM16bit×1024byte······Embedded in LSI C
6···SRAM16bit×2048byte······Memory Chip
    Access Time 12ns
7···ROM32bit×1024byte······Embedded in LSI D
    Access Time 70ns LSI-A: 208pin
LSI-B: 80pin
LSI-C: 120pin
LSI-D: 40pin
LSI-E: 90pin

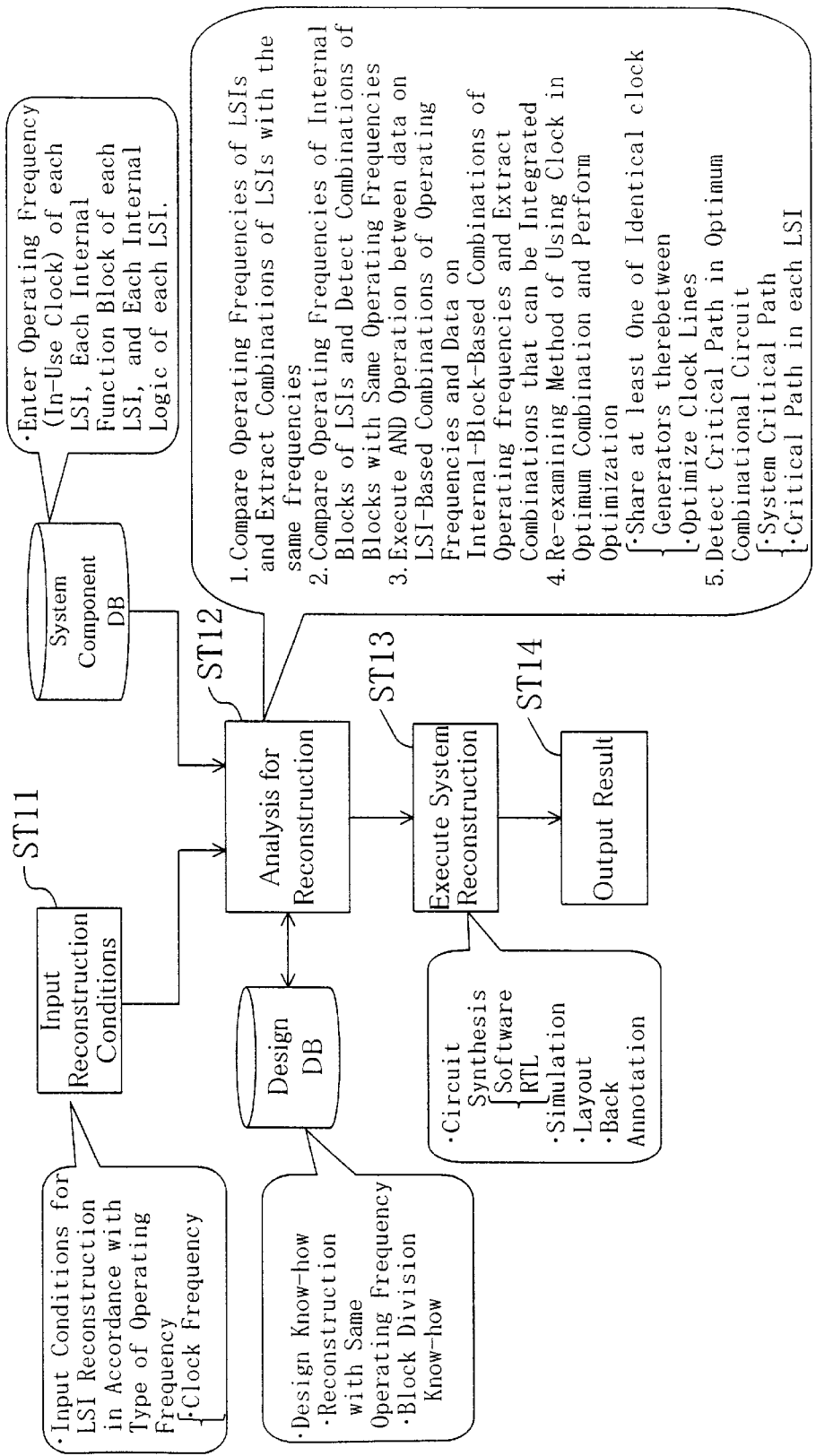

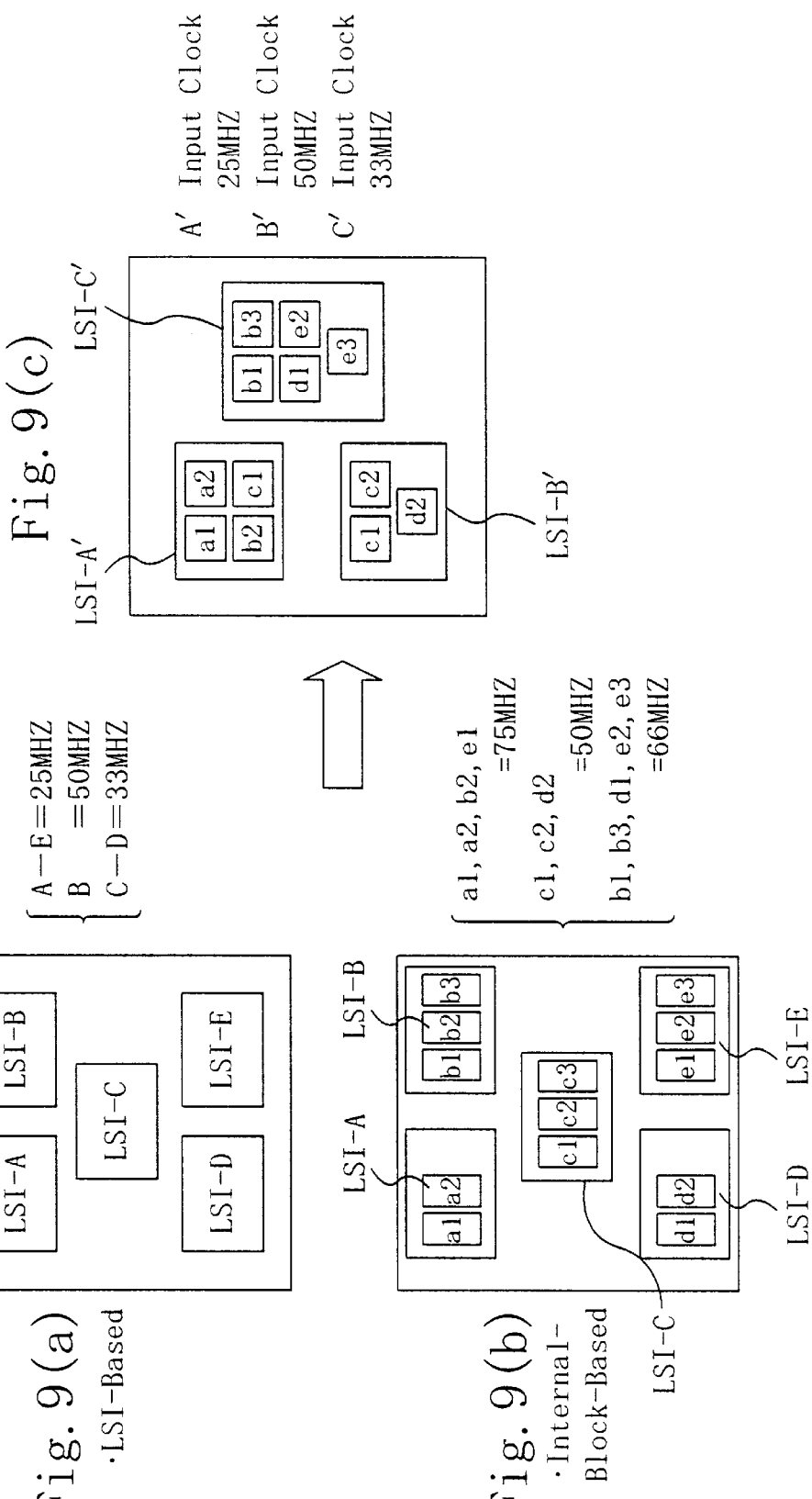

Fig. 15(a) Current Circuit

Fig. 15(b) Insertion of Flip-Flops

Fig. 18

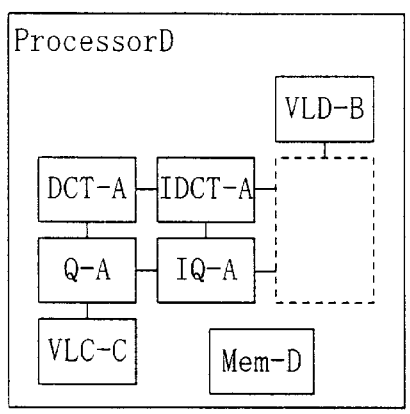

Present Reconstruction Data

·Selected Circuit Data for
  Implementing Requested Function
  DCT-A, Q-A, VLC-C,
  IDCT-A、IQ-A、VLD-B、Mem-D ·Data on Sharing of Parallel
  Operating Unit
    IDCT-A and IQ-A are shared Because
    of their no Necessity for
    Simultaneous Operation ·Data on Replacement of Overspec
  Circuit
    Select VLD-B in Place of VLD-A
    Based on Number of Bits Required
    for Operation
    Additional Circuit is Necessary for
    Connection between IDCT-A and IQ-A ·Data on Memory Capacity Reduction
  Reduce Capacity of Mem-A by
  Calculating Required Memory Capacity · Share Non-Parallel Operating Portion
· Replace Overspec Circuit
· Reduce Memory Capacity

Fig. 27

| | Functions | Input/Output Pins and Node | | | |
|---|---|---|---|---|---|
| | | External Pin | | Internal Node | |
| | | Input | Output | Input | Output |
| IP-A | Whole IP | PIN-IA, PIN-IB, PIN-IC, … | PIN-OA, PIN-OB, PIN-OC, … | | |
| | BlockA | | | | |
| |   FunctionA-1 | PIN-IA, PIN-IB, PIN-IC, … | | NB4 | NA6, NA7, NA8, NA9 |
| |   FunctionA-2 | PIN-IA, PIN-IF | | NA4 | NA1, NA2, NA3 |
| | ⋮ | PIN-IB, PIN-IC | | NA3 | NA4, NA5, NA9 |
| | BlockB | | | | |
| |   FunctionB-1 | PIN-ID, PIN-IE, PIN-IG | | NA9 | NB4, NB5, NB7 |
| |   FunctionB-2 | PIN-ID, PIN-IE, PIN-IG | | NA9 | NB1, NB2, NB3 |
| | ⋮ | | | NB1, NB2 | NB4, NB5, NB6 |
| | BlockC | | | | |
| |   FunctionC-1 | PIN-IH | PIN-OA, PIN-OB, PIN-OC | NA6, NA7, NA8, NB5 | NC4 |
| |   FunctionC-2 | PIN-IH | PIN-OA, PIN-OB | NA6, NA7, NA8, NB5 | NC1, NC2, NC3 |
| | ⋮ | | | NC1 | |
| | BlockD | | | | |
| |   FunctionD-1 | | PIN-OD | NB7, NC4 | ND1, ND2 |
| |   FunctionD-2 | | PIN-OD | NB7, NC4 | |
| | ⋮ | | | ND1, ND2 | |
| IP-B | Whole IP | PIN-IA, PIN-IB, PIN-IC, … | PIN-OA, PIN-OB, PIN-OC, … | | |
| | BlockA | PIN-IA, PIN-IB, PIN-IC, … | | | |
| | ⋮ | | | | |

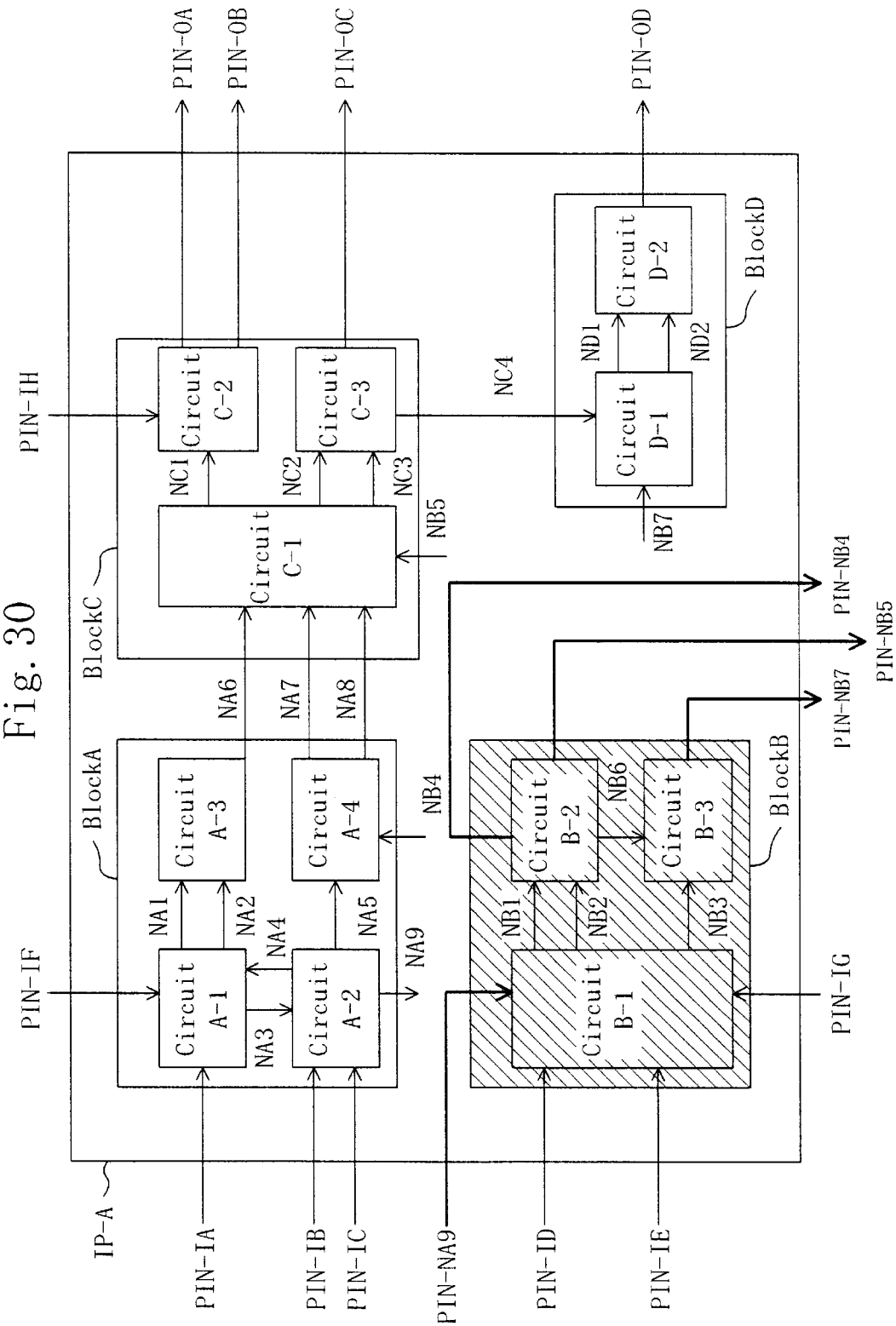

METHOD OF DESIGNING SEMICONDUCTOR INTEGRATED CIRCUIT DEVICE

BACKGROUND OF THE INVENTION

The present invention relates to a method of designing a semiconductor integrated circuit by using a database in which existing properties such as IPs are stored.

In generating a new semiconductor integrated circuit device (an LSI, a system LSI, or a circuit) by using IPs as existing properties or partly modifying an existing semiconductor integrated circuit device, a selection of IPs (such as chips) to construct such a system has been executed conventionally during the design stage by depending on the experience of a designer who manually builds up functions in the respective IPs.

A high degree of skill is particularly required of the designer in the case of integrating IPs which are different in parameters such as circuit scale, memory capacity, number of pins, and clock system or in synchronous/non-synchronous operating modes, reconstructing or generating a system having a plurality of processors, or using some of IPs.

However, as a semiconductor integrated circuit device to be designed has been increased in scale in recent years, discrepancies in a plurality of parameters have been observed among an enormous number of elements composing the semiconductor integrated circuit. When IPs as the existing design resources are reused, it is particularly difficult to effectively use the IPs or some of the IPs by depending only on the experience of the designer due to the discrepancies in parameters and the like. As a result, a situation where the design period is increased significantly or design itself is impossible.

SUMMARY OF THE INVENTION

The present invention has been achieved by focusing attention on the fact that the cause of the foregoing difficulties encountered in the conventional design of a semiconductor integrated circuit device is lack of proper means for dividing each IP into functions and analyzing and grouping the functions. It is therefore an object of the present invention to design a semiconductor integrated circuit device in consideration of different parameters and the like after analyzing the function of each IP and thereby reducing a design period through automated design and improve the quality of the designed semiconductor integrated circuit device.

A first method of designing a semiconductor integrated circuit device is a method of designing a semiconductor integrated circuit device by using a database storing therein data on a plurality of circuits having different parameters, the method comprising the steps of: (a) inputting specifications required of the semiconductor integrated circuit device; (b) inputting data on the plurality of circuits stored in the database and automatically analyzing the parameters of the circuits; and (c) automatically designing the semiconductor integrated circuit device in accordance with a result of the analysis to satisfy the required specifications.

The method allows a plurality of circuits containing different parameters to be automatically integrated into a single semiconductor integrated circuit device, while satisfying the required specifications. This allows a reduction in design period and an improvement in the quality of the designed semiconductor integrated circuit device even if it is on a large scale.

The parameters are scales of the plurality of circuits, the step (a) includes inputting constraints on a circuit area or a number of gates of the semiconductor integrated circuit device to be designed, and the step (b) includes analyzing a combination of circuits to be embedded in the semiconductor integrated circuit device, while holding the circuit area or number of gates of the semiconductor integrated circuit device within the constraints, whereby the circuit area of the designed integrated circuit device is minimized.

The step (b) includes analyzing sharability of a pad between the circuits. This allows a reduction in circuit area through the sharing of the pad.

The parameters are types or capacities of memories of the plurality of circuits, the step (a) includes inputting types of memories of the semiconductor integrated circuit device to be designed and constraints on capacities thereof, and the step (b) includes analyzing an optimum combination of memories according to sharing of an external memory between the circuits and to sharability or divisibility of the memories between the circuits.

This minimizes the memory capacity.

The parameters are numbers of pins of the plurality of circuits, the step (a) includes inputting constraints on a number of pins of each of circuits of the semiconductor integrated circuit device to be designed, and the step (b) includes analyzing an optimum combination; of circuits, while holding the number of pins of each of the circuits within the constraints.

This allows design considering constraints on the number of pins.

The step (b) includes analyzing the optimum combination of circuits also in consideration of types of the pins of each of the circuits. This allows design considering the compatibility of the attributes of the pins as well.

The parameters are clock frequencies of the plurality of circuits, the step (a) includes inputting a clock frequency in each of circuits of the semiconductor integrated circuit device to be designed, and the step (b) includes analyzing an optimum combination of circuits such that the operating frequencies of the circuits match the clock frequency inputted in the step (a).

This allows the semiconductor integrated circuit device to be designed, while causing a large number of circuits to operate smoothly with the required clock frequency.

The step (b) includes performing the analysis for sharing of a clock generator between the circuits and for optimization of clock lines. This further improves the quality of the designed semiconductor integrated circuit device.

A second method of designing a semiconductor integrated circuit device is a method of designing a semiconductor integrated circuit by using a database storing therein data on at least respective upper-limit operating frequencies of a plurality of circuits having different operating frequencies, the method comprising the step of: analyzing the operating frequencies and upper-limit operating frequencies of the plurality of circuits stored in the database and optimizing or reconstructing the plurality of circuits.

The method allows easy designing of a semiconductor integrated circuit device into which a plurality of circuit operating at different frequencies have been incorporated.

A third method of designing a semiconductor integrated circuit device is a method of designing a semiconductor integrated circuit device by using a database storing therein data on at least upper-limit operating frequencies of a plurality of circuits having different operating frequencies, the method comprising the steps of: (a) inputting specifications required of a clock of the semiconductor integrated circuit device; (b) fetching data on the plurality of circuits in the database and analyzing a possibility of a trade-off between the upper-limit operating frequencies of the circuits and the specifications required of the clock; and (c) displaying whether or not the semiconductor integrated circuit can be designed depending on a result of the analysis.

The method allows designing of a semiconductor integrated circuit device in consideration of the upper-limit operating frequencies of the plurality of circuits, while causing the operations of the plurality of circuits to satisfy the required specifications.

The step (b) includes performing the analysis in consideration of a possibility of sharing a clock system between the circuits. This renders the clock system in the designed semiconductor integrated circuit device as simple as possible.

Preferably, the method further comprises, if it is judged in the step (c) that the semiconductor integrated circuit device cannot be designed, the step of: (d) generating, for those of the plurality of circuits which do not satisfy the specifications required of the clock inputted in the step (a), additional circuits for causing the circuits to satisfy the specifications required of the clock.

In that case, the step (d) may include generating additional circuits for changing, to non-synchronous circuits, at least some of the circuits which do not satisfy the specifications required of the clock inputted in the step (a).

A fourth method of designing a semiconductor integrated circuit device is a method of designing a semiconductor integrated circuit device by using a database storing therein data on at least one circuit controlled by a micro-code, the method comprising the step of: analyzing an operation of the circuit controlled by the micro-code and stored in the database to optimize or reconstruct the circuit.

The method allows a circuit operating in accordance with a micro-code, such as a processor, to be automatically optimized or reconstructed.

A fifth method of designing a semiconductor integrated circuit device is a method of designing a semiconductor integrated circuit device by using a database storing therein data on a circuit controlled by a micro-code, the method comprising the steps of: (a) inputting specifications required of the micro-code in use for controlling a circuit to be designed; (b) fetching the data in the database and analyzing an operation of the circuit controlled by the micro-code; (c) comparing the analyzed operation of the circuit with the inputted specifications required of the micro-code in use to analyze a possibility of generating the circuit to be designed in accordance with the micro-code in use; and (d) displaying whether or not the circuit can be designed depending on a result of the analysis.

The method allows designing of a circuit including the correction of the function of a circuit such as a processor such that the required specifications are satisfied and allows the respective functions of the plurality of circuits to be implemented by one circuit.

The step (b) includes: performing the analysis in consideration of a parallel operation in the circuit. This simplifies the circuit.

The step (b) includes: performing the analysis in consideration of at least either one of a used capacity of a memory and a number of bits required for an operation in the circuit. This achieves a reduction in the excessive specs of the designed circuit.

Preferably, the method further comprises, if it is judged that the circuit cannot be designed, the step of: generating an additional circuit for causing the circuit to satisfy the specifications required of the micro-code in use.

A sixth method of designing a semiconductor integrated circuit device is a method of designing a semiconductor integrated circuit device by using a database storing therein data on a plurality of circuits each containing a plurality of operations, the method comprising the steps of: (a) inputting a function required of a circuit to be designed; (b) fetching the data in the database, comparing the operations in each of the circuits with operations necessary to implement the required function, and automatically analyzing a possibility of generating the circuit to be designed from the operations contained in the plurality of circuits stored in the database; and (c) automatically displaying whether or not the circuit can be designed depending on a result of the analysis.

The method allows the operation of integrating a large number of circuits into a single semiconductor integrated circuit to be performed automatically.

A seventh method of designing; a semiconductor integrated circuit device is a method of designing a semiconductor integrated circuit device by using a database storing therein data on a plurality of circuits each containing a plurality of operations, the method comprising the steps of: (a) inputting a function required of a circuit to be designed; (b) extracting data on at least one of the plurality of circuits stored in the database, comparing the operations contained in the extracted circuit with operations necessary to implement the required function, and analyzing a possibility of generating the circuit to be designed from the operations contained in the extracted circuit; and (c) automatically displaying, if there is an operation lacking to implement the required function, the circuit containing the lacking operation that has been stored in the database.

The method also allows the operation of integrating a large number of circuits into a single semiconductor integrated circuit to be performed automatically.

An eighth method of designing a semiconductor integrated circuit device is a method of designing a semiconductor integrated circuit device by using a database storing therein data on a plurality of circuits each containing a plurality of operations and circuit elements required to execute the operations, the method comprising the steps of: (a) inputting a function required of a circuit to be designed; and (b) extracting data on at least one of the plurality of circuits stored in the database, comparing circuit elements necessary to execute the operations contained in the extracted circuit with operations necessary to implement the required function, and automatically deleting, among the circuit elements contained in the extracted circuit, the circuit element unnecessary for generation of the circuit to be designed.

The method simplifies the function of an existing circuit and allows generation of a new circuit by using the existing circuit.

A ninth method of designing a semiconductor integrated circuit device is a method of designing a semiconductor integrated circuit device by using a database storing therein data on IPs containing a plurality of functions, the method comprising the step of: organizing the IPs into a hierarchical configuration and storing the IPs in the hierarchical configuration in the database such that a connecting portion between the functions of the IPs is extracted to the outside of the IPs.

The method provides a database which can be used to design a semiconductor integrated circuit device by using some of the plurality of functions of the IPs.

A tenth method of designing a semiconductor integrated circuit device is a method of designing a semiconductor integrated circuit device by using a database storing therein data on IPs as design resources containing a plurality of functions, the data including data on a connecting portion between the internal functions of the IPs and being organized in a hierarchical configuration, the method comprising the steps of: (a) extracting the data on the functions of the IPs and on the connecting portion between the functions of the IPs; and (b) withdrawing, to the outside of the IPs, the connecting portion between those of the extracted functions of the IPs to be reused.

The method allows various design to be performed by using some of the functions of the IPs.

The method further comprises the step of: after the step (b), generating the withdrawn connecting portion between the functions as an input/output pin and thereby designing a new semiconductor integrated circuit device composed only of the functions to be reused, thereby allowing generation of a new IP.

The method may further comprise the step of: after the step (b), connecting the withdrawn connecting portion between the functions to another IP different from the IP for which the functions are to be reused and thereby designing a new semiconductor integrated circuit device from the IP for which the functions are to be reused and the other IP.

The method further comprises the step of: after the step (b), connecting the withdrawn connecting portion between the functions to another IP different from the IP for which the functions are to be reused, while deleting the same function of the other IP as the extracted function, and thereby designing a new semiconductor integrated circuit device from the IP for which the functions are to be reused and the other IP. This achieves a reduction in an area occupied by the designed semiconductor integrated circuit device.

BRIEF DESCRIPTION OF THE DRAWINGS

FIGS. 3(a) to 3(d) show respective configurations of circuits to be reconstructed and data appearing in each of the steps shown in FIG. 2.

FIG. 4 is a flow chart illustrating the basic procedure of system reconstruction in a second example of the first embodiment;

FIG. 8 is a flow chart showing the basic procedure of system reconstruction in a fourth example of the first embodiment;

FIGS. 9(a) to 9(c) show the result of extracting the operating frequencies of LSIs to be reconstructed, the result of extracting the operating frequencies of the internal blocks of the LSIs, and a post-reconstruction structure of a system in the fourth example of the first embodiment;

FIG. 18 shows an example of data necessary for re-designing in the first example of the third embodiment;

FIG. 27 shows a list of data on IP-A stored in the design database in the first example of the fourth embodiment;

FIG. 30 shows the state in which an internal node of a block of the IP stored in a design database has been withdrawn and provided with input/output pins for use in another IP in a third example of the fourth embodiment;

DETAILED DESCRIPTION OF THE INVENTION

EMBODIMENT 1

In the present embodiment, a method of performing reconstruction in consideration of commonalties between existing design resources and constraints thereon in designing a new semiconductor integrated circuit device (system or LSIs as the elements of the system) by using the existing design resources will be described in the individual examples thereof each corresponding to a parameter in consideration.

EXAMPLE 1

Figure 1:
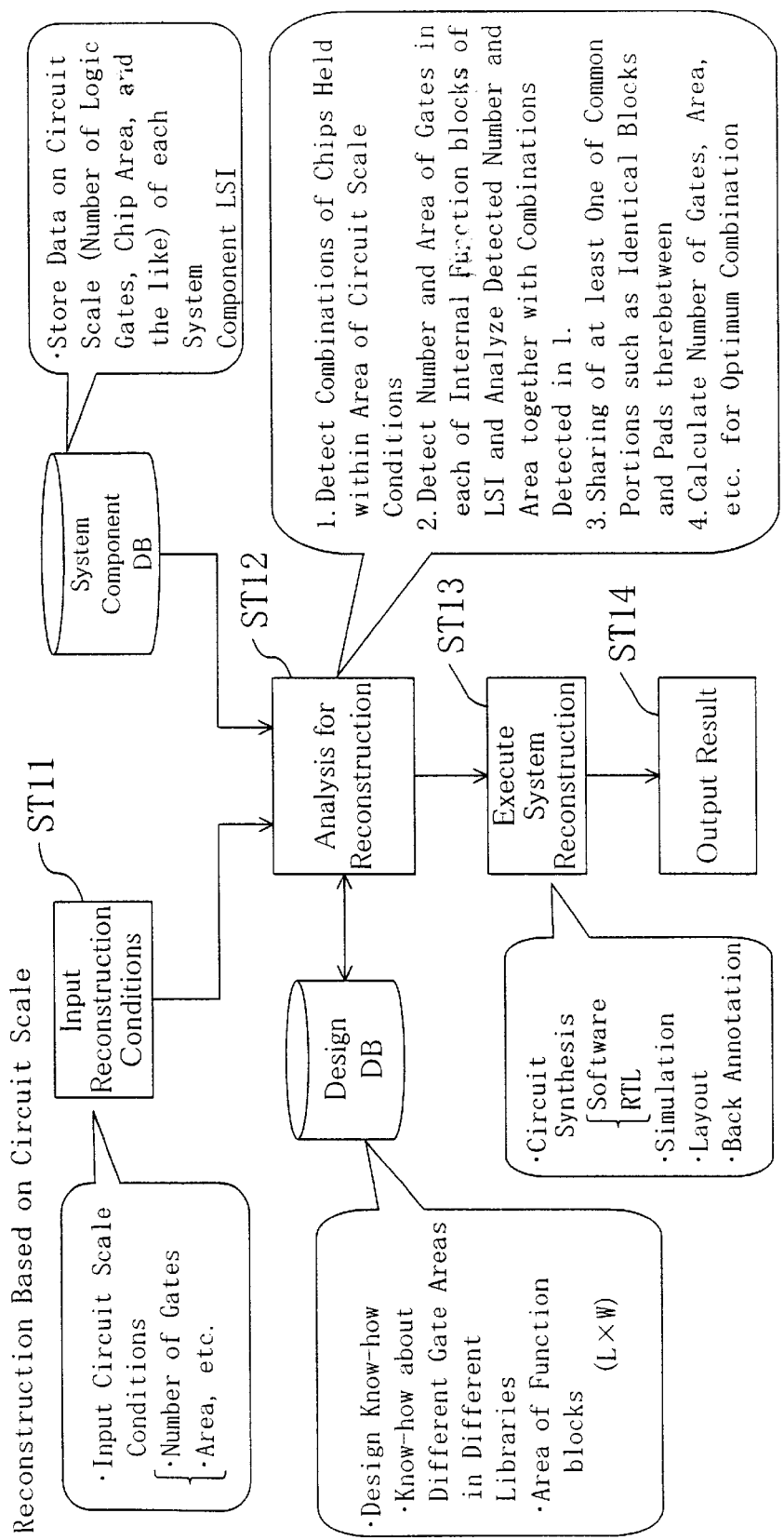
FIG. 1 is a flow chart illustrating the basic procedure of system reconstruction in a first example of a first embodiment according to the present invention.

In the present example, a description will be given to a method of reconstructing a system or LSIs under circuit scale constraints included in the existing design resources. FIG. 1 is a flow chart illustrating the basic procedure of system reconstruction in the present example.

First, in Step ST11, data on reconstruction conditions are inputted. The data on reconstruction conditions include, as circuit scale conditions, the number of gates, chip area, and the like. As the chip area, a size of L×W is stored.

Next, in Step ST12, the reconstruction data inputted in Step ST11, data in a system component DB (database), and data in a design DB (database) are inputted and combinations of chips that can be held within an area specified by the circuit scale conditions are detected automatically (analysis). Examples of items to be detected include the number and area of gates in a function block in an LSI, sharable portions of common portions such as identical blocks, a pad, and a peripheral portion of the pad, the number and area of gates calculated for an optimum combination. In the system component DB, data on the circuit scale of each of LSIs composing a system to be reconstructed, such as the number of logic gates and chip area, is stored. In the design DB, know-how about different gate areas in different libraries and data on the areas of the function blocks is stored.

Next, in Step ST13, system reconstruction is executed. Specific operations of system reconstruction include circuit synthesis on the software or RT level, simulation, automatic layout based on the result of the synthesis, and back-annotation of delay data extracted from the layout. Thereafter, the result of reconstruction is outputted in Step ST14.

Figure 2:
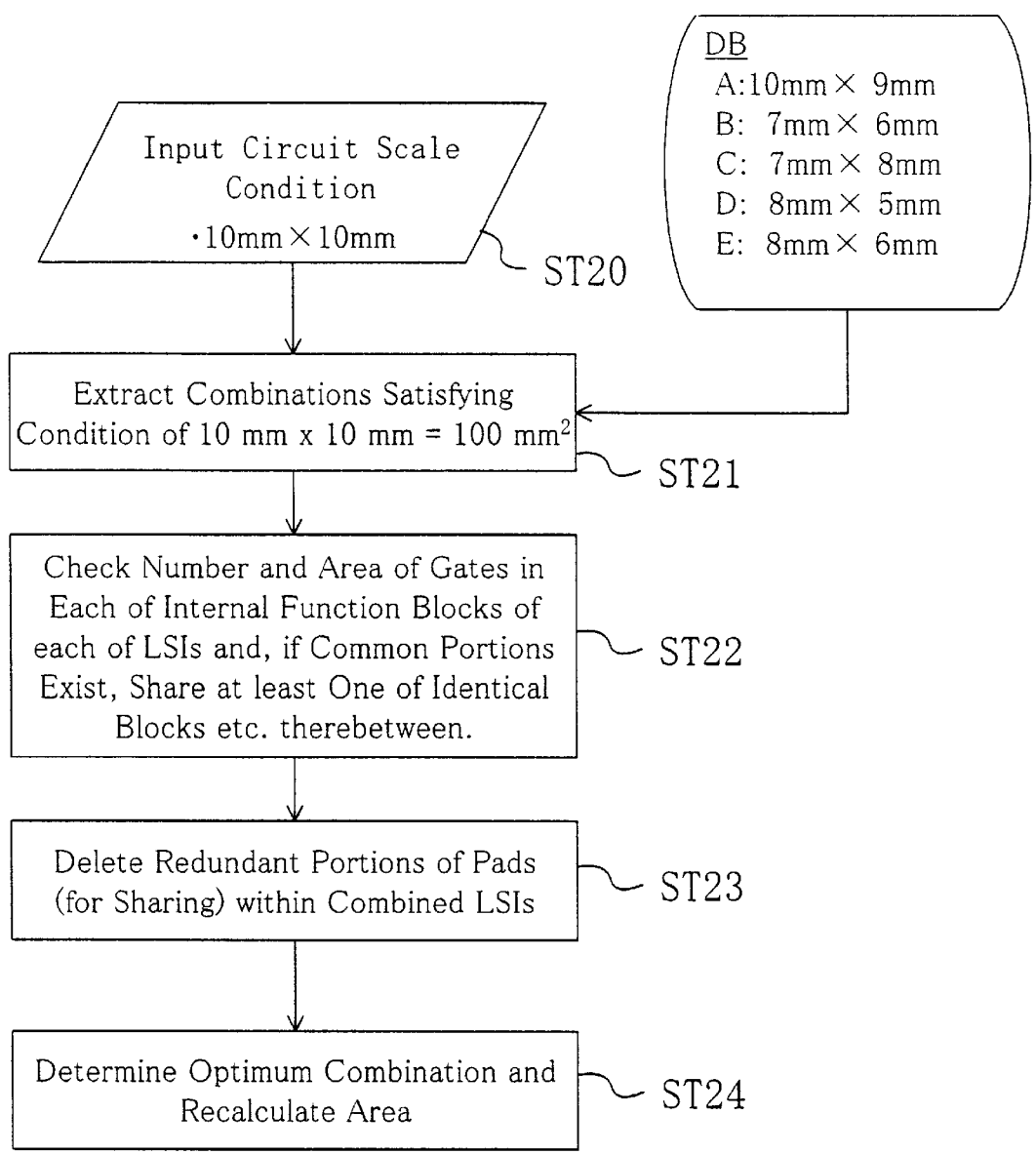
FIG. 2 is a flow chart illustrating the procedure of automatic sharing of a pad portion in the first example of the first embodiment.

FIG. 2 is a flow chart illustrating the procedure of performing system reconstruction by automatically sharing the pad portion. FIGS. 3(a) to 3(d) show respective configurations of circuits to be reconstructed and data appearing in each of the steps shown in FIG. 2. The process of the present specific example will be described with reference to the flow chart of FIG. 2.

First, in Step ST20, A circuit scale condition for a circuit to be designed is inputted. In this case, the condition that "the chip area should be 10 mm×10 mm=100 mm² or less" is set.

Next, in Step ST21, it is assumed that data on five usable circuits A to E as shown in FIG. 3(a) is extracted upon receipt of data on the respective areas of the circuits A to E from the system component DB. Based on the data, combinations of the circuits A to E which can perform a desired function and can be held in a chip area of 10 mm×10 mm=100 mm² are extracted. As a result, only the circuit A, the combination of the circuits B and D, and the combination of the circuits C and E are extracted. Although the area becomes 100 mm² or more if the circuits B and C are combined, the combination of the circuits B and C is regarded as one to be examined since an area of 100 mm² or less may be achieved by reducing the area through sharing, which will be described below.

Next, in Step ST22, the area occupied by gates in each of internal function blocks of each of LSIs are checked. If there are common portions, at least one of the same blocks is shared. Then, in Step ST23, the redundant portion of the pad in an LSI composed of the combination of the circuits is removed for sharing. For example, the areas occupied by pads in the circuits B and D are extracted, as shown in FIG. 3(c), and the circuit B is assumed to have ten VCC pads and ten GND pads each occupying an area of 0.5 mm². On the other hand, the circuit D is assumed to have eight VCC pads and eight GND pads each occupying an area of 0.5 mm². Although the total number of pads is 36 if the circuits B and D are mounted as they are, it is assumed that sharing of some of the pads is found to reduce the total number of pads when the circuits B and C are combined, so that only twelve VCC pads and twelve GND are sufficient. The sharing of the pad portions allows an area reduction of 12×0.5=6 (mm²). Likewise, it is assumed that the circuits C and E are combined and an area reduction of 6 (mm²) is achievable by sharing of the pad portions.

If the optimum combination is determined and the area is recalculated in Step ST24, therefore, a system composed of the circuit A (without any alterations), a new circuit B' composed of the combination of the circuits B and D, and a new circuit C' composed of the combination of the circuits C and E is reconstructed.

If the circuit scale condition is inputted in the flow shown in FIG. 2, the extraction of combinations of circuits from the system component DB is easy since the extraction of each of the circuits and the retrieval and extraction of the number of pads and area of each of the circuits is performed automatically by setting such conditions that the number of circuits to be combined should be 2 or less and the total area of the combined circuits should be 100±25 (mm²). Accordingly, the processes in Steps ST22, ST23, and ST24 can be performed automatically with ease.

Likewise, the operation of system construction can be performed automatically by extracting sharable blocks based on the number of gates which is common to the function blocks and sharing at least one of the same blocks.

In reconstructing a system or LSIs, the present example achieves a reduction in pad area and a reduction in the area of a semiconductor integrated circuit device by sharing at least one of circuit blocks.

EXAMPLE 2

In the present example, a description will be given to a method of reconstructing a system or LSIs while optimizing memories used in existing design resources.

Figure 5B:
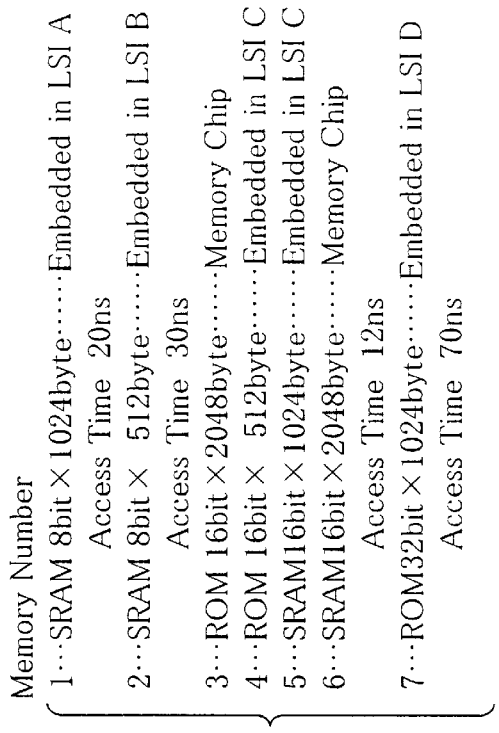
FIGS. 5(a) to 5(c) show a circuit for which system reconstruction is to be performed, a memory list, and a circuit after reconstruction in the second example of the first embodiment.
Figure 5A:
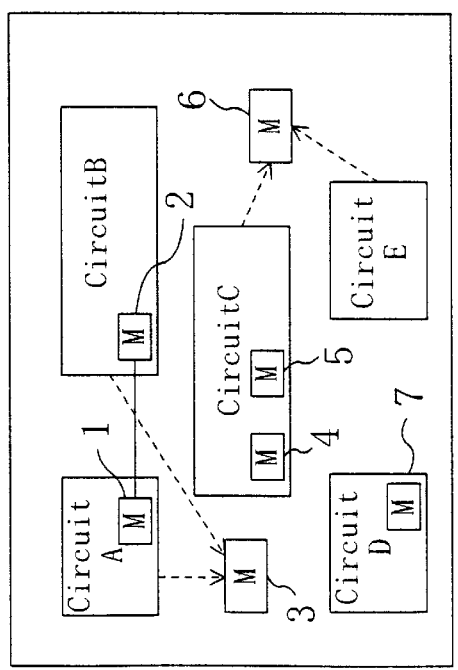
Figure 5C:
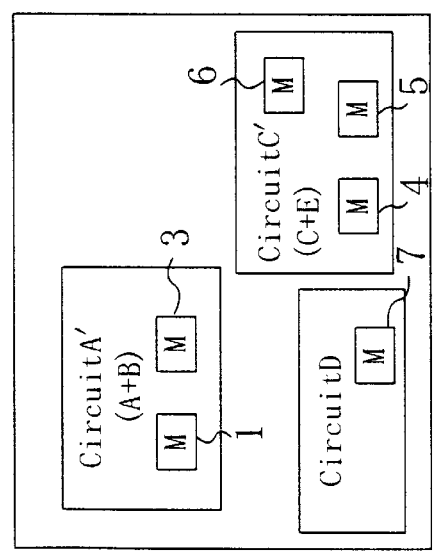

FIG. 4 is a flow chart illustrating the basic procedure of system reconstruction in the present example. FIGS. 5(a) to 5(c) show a circuit for which system reconstruction is to be performed, a memory list, and a circuit after reconstruction in the present example. Referring to FIGS. 5(a) and 5(b) and the flow chart of FIG. 4, an example of the procedure of system construction will be described. The basic flow of the process for reconstruction of the present example is the same as that of the first example but conditions to be inputted and the content of analysis for reconstruction of the present example are different from those of the first example.

First, in Step ST11, data on reconstruction conditions is inputted. The data on reconstruction conditions include conditions for memories in LSIs (internal memories), external memories, and the like as conditions for optimized use of the memories.

Next, in Step ST12, the reconstruction conditions inputted in Step ST11, data in a system component DB (database), and data in a design DB (database) are inputted and the possibility of combining circuits is automatically analyzed, while the memories are shared and divided. In the system component DB, the respective configurations and specifications of memories in a system and memories in LSIs are stored. For example, data on memory sizes (address widths and bit widths), access speeds, timings, the types of the memories, and the like is stored. In the design DB, data on the sharing of memories, methods of dividing memories, access timings, and the like is stored as design know-how.

The following is examples of items to be analyzed. First, the memory used in each of the LSIs and the memories used in the other LSIs are compared with each other and the state in which the external memories are shared is analyzed. For example, it is assumed that the shared memory 3 is accessed from the circuits A and B and the shared memory 6 is accessed from the circuits C and E, as shown in FIG. 5(a). This provides data on the sharing of the external memories 3 and 6. This also provides a memory list as shown in FIG. 5(b), which shows the types, locations, sizes, and access speeds (access times) of the memories 1 to 7. Since the types of the memories 1 and 2 are SRAMs, the bit width of each of the memories 1 and 2 is 8 bits, the address number of the memory 1 is larger than that of the memory 2, and the access time of the memory 1 is longer than that of the memory 2 as shown in FIG. 5(b), it will be understood that the memory 1 can be shared. From the results of the two analyses, an optimum combination of memories is automatically extracted. For example, a combination of the circuits A and B sharing the memory 5 and a combination of the circuits C and E sharing the memory 6 are extracted and other sharable memories, the divisibility of the memories are automatically analyzed. Finally, the access speeds and the memory sizes are examined and sharing and division of the memories is performed provided that there occurs no problem.

As a result, system reconstruction is performed in Step ST13 and a new circuit A' composed of a combination of the circuits A and B and having the memories 1 and 3 embedded therein and a new circuit C' composed of a combination of the circuits C and E and having the memories 5 and 6 embedded therein are generated, as shown in FIG. 5(c). That is, the memory 3 is also used as the memory 2 and the memory 3 (external ROM) is embedded in the new circuit A'. The memory 6 which used to be independent as a memory chip is embedded in the new circuit C'. During the execution of reconstruction, circuit synthesis on the software or RT level, simulation, automatic layout based on the result of the synthesis, back-annotation of delay data extracted from the layout, and the like are performed, similarly to the first example.

Finally, the result of reconstruction is outputted in Step ST14. In the present example also, each of Steps ST11 to ST14 shown in FIG. 4 can be performed automatically, similarly to the first example. If memory size has redundancy, memory division may also be performed, though the description thereof is omitted in the present example.

The present example achieves simplification of a structure and a reduction in chip area by memory sharing, a reduction in chip area by memory division, and the like.

EXAMPLE 3

In the present embodiment, a description will be given to a method of reconstructing a system or LSIs under the constraints on the number and types of pins used in existing design resources.

Figure 6:
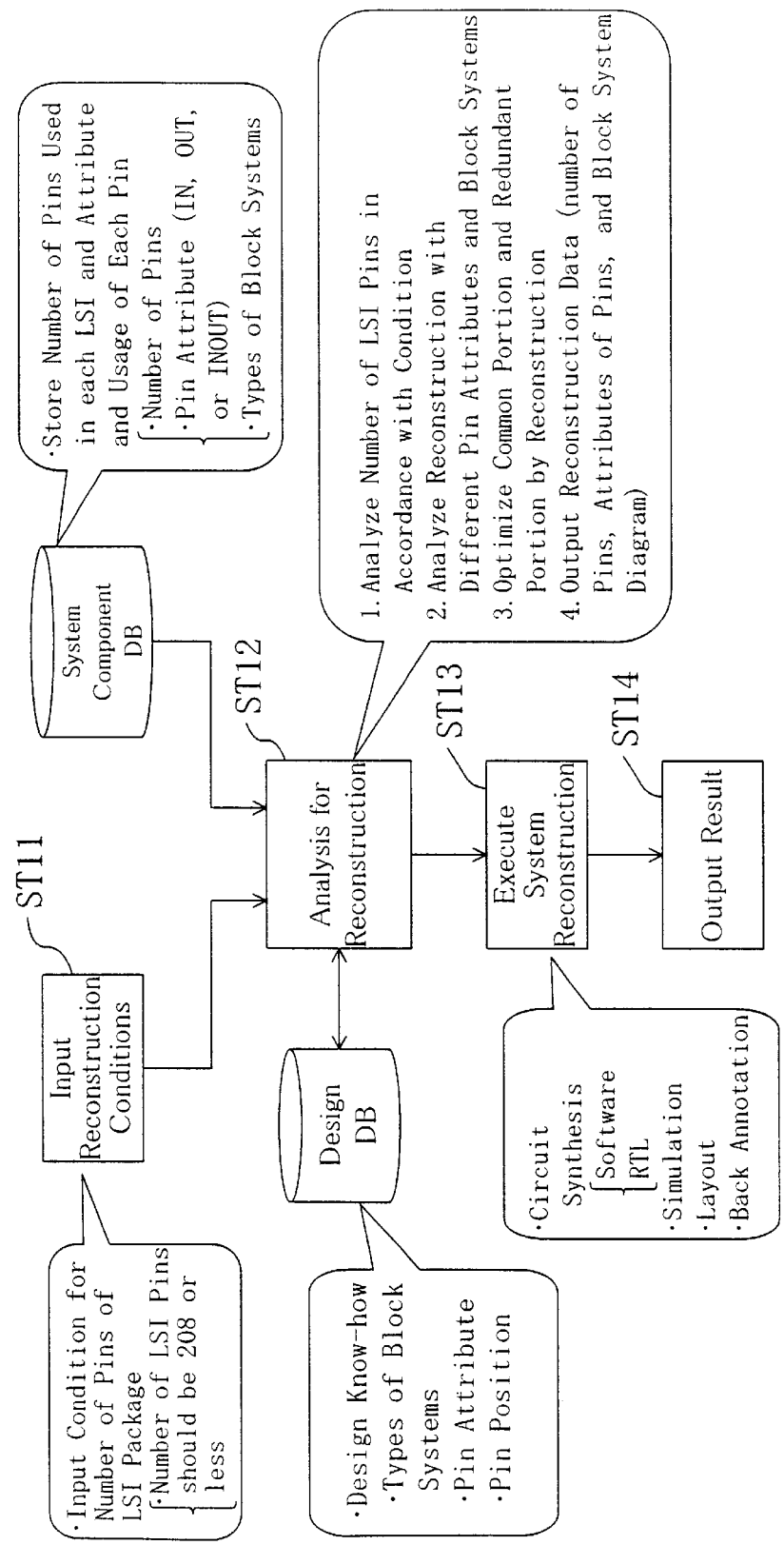
FIG. 6 is a flow chart showing the basic procedure of system reconstruction in a third example of the first embodiment.
Figure 7A:
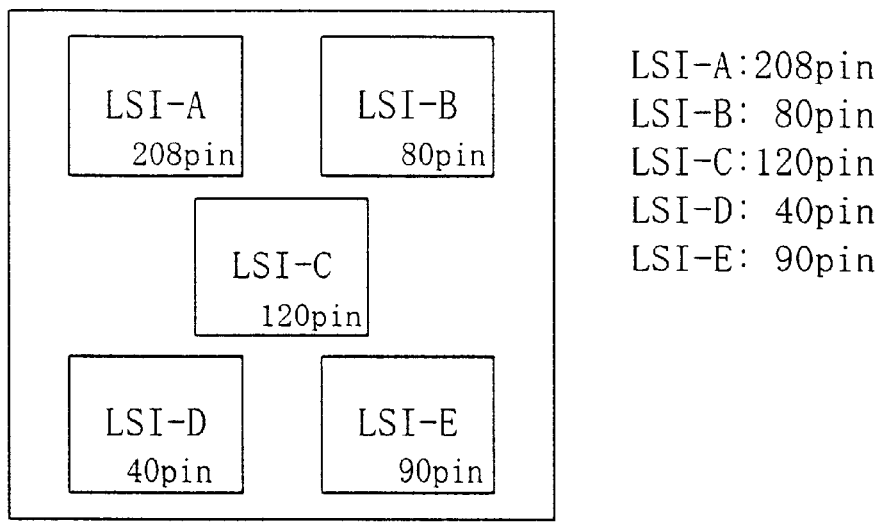
FIGS. 7(a) and 7(b) show the pre- and post-reconstruction states of LSIs for which system reconstruction is to be performed in the third example of the first embodiment.
Figure 7B:
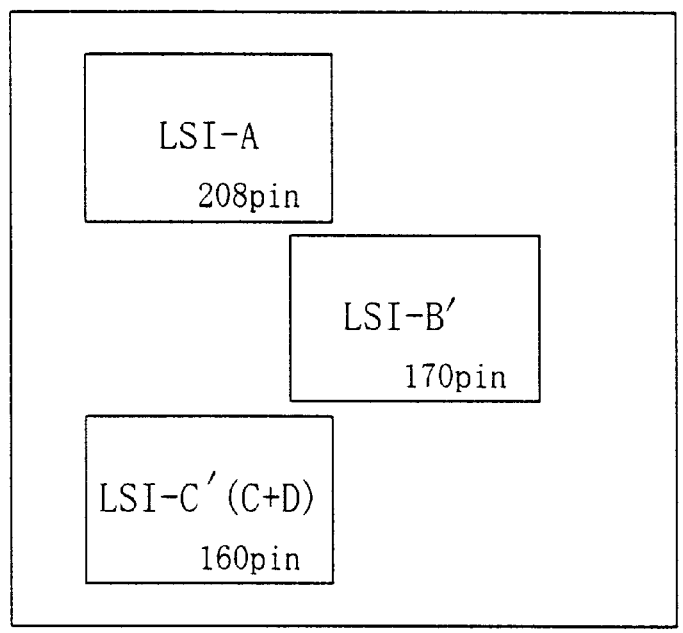

FIG. 6 is a flow chart illustrating the basic procedure of system reconstruction in the present example. FIGS. 7(a) and 7(b) show the pre- and post-reconstruction states of LSIs for which system reconstruction is to be performed in the present example. Referring to the flow chart of FIG. 6 and FIGS. 7(a) and 7(b), an example of the procedure of system reconstruction will be described. The basic flow of the process for reconstruction of the present example is the same as that of the first example but conditions to be inputted and the content of analysis for reconstruction of the present example are different from those of the first example.

First, in Step ST11, data on reconstruction conditions is inputted. The reconstruction conditions include a condition on the number of pins specifying that the number of package pins of an LSI "should be 208 or less".

Next, in Step ST12, the reconstruction conditions inputted in Step ST11, data in a system component DB (database), and data in a design DB (database) are inputted in Step ST12 and the possibility of combining circuits is automatically analyzed in accordance with the conditions including constraints on the number of pins and the like. In the system component DB, the number of pins used in each of LSIs, the attribute (IN, OUT, or IN/OUT) and usage of each of the pins, the sort of each of block systems (control block, output circuit block, or the like), and the like are stored. In this example, it is assumed that the number of pins of the LSI-A is 208, the number of pins of the LSI-B is 80, the number of pins of the LSI-C is 120, the number of pins of the LSI-D is 40, and the number of pins of the LSI-E is 90, as shown in FIG. 7(a). Design know-how stored in the design DB include the sorts of block systems, the attributes and positions of the pins, and the like.

The following is examples of items to be analyzed. First, the number of pins is analyzed in accordance with the conditions. In this example, the respective numbers of pins of the LSI-A to LSI-E are as shown in FIG. 7(a). Moreover, the attributes of the pins, the positions of the LSIs in accordance with the block systems, and the like are analyzed for reconstruction. Furthermore, the shared portions resulting from reconstruction, the possibility of optimization of redundant portions, and the like are analyzed. The types of pins include a debug pin, a power-source pin, a ground pin, a test pin, and a probe. These portions can be reduced by integrating the LSIs such that the redundant portions are reduced. Then, data such as the numbers of pins, the attributes of pins, the types of pins, and a block system chart are outputted as reconstruction data. The results of analyses obtained are such that the sum of the numbers of the pins of the LSI-B and the LSI-C is 200, the sum of the numbers of the pins of the LSI-D and the LSI-E is 130, the number of pins sharable between the LSI-B and the LSI-C is 3, and there is no pin sharable between the LSI-D and the LSI-E.

If another combination is examined, the results of analyses obtained are such that the sum of the numbers of pins of the LSI-B and the LSI-E is 170, the sum of the numbers of pins of the LSI-C and the LSI-D is 160, the LSI-B and the LSI-E have blocks and twelve pins sharable therebetween, and the LSI-C and the LSI-D have eight pins sharable therebetween. Then, in Step ST13, system reconstruction is performed in a most profitable pattern, with the result that the LIS-A remains as it is and a new LSI-B' composed of a combination of the LSI-B and the LSI-E and having 170 pins and a new LSI-C' composed of a combination of the LSI-C and the LSI-D and having 160 pins are generated, as shown in FIG. 7(b). In this case, the LSI-A cannot be combined with another circuit since the pin number of the LSI-A has reached the maximum number. During the execution of reconstruction, circuit synthesis on the software or RT level, simulation, automatic layout of the result of the synthesis, back-annotation of delay data extracted from the layout, and the like are performed, similarly to the first embodiment.

Then, the result of reconstruction is outputted finally in Step ST14. In the present embodiment also, each of Steps ST11 to ST14 shown in FIG. 4 can be performed automatically.

The present embodiment allows automatic reconstruction of LSIs to be performed without deviating from the constraints on the number of pins, the attributes of the pins, and the like, while achieving simplification of the structure and a cost reduction by removing redundant portions.

EXAMPLE 4

In the present embodiment, a description will be given to a method of reconstructing a system or LSIs in accordance with the sorts of operating frequencies (clock frequencies) used in existing design resources.

FIG. 8 is a flow chart illustrating the basic procedure of system reconstruction in the present example. FIGS. 9(a) to 9(c) show the result of extracting the operating frequencies of LSIs for which system reconstruction is to be performed, the result of extracting the operating frequencies of the internal blocks of the LSIs, and the post-reconstruction structure of the system in the present example. Referring to the flow chart of FIG. 8 and FIGS. 9(a) to 9(c), an example of the procedure of system reconstruction will be described. The basic flow of the process for reconstruction of the present example is the same as that of the first example but conditions to be inputted and the content of analysis for reconstruction of the present example are different from those of the first example.

First, in Step ST11, data on reconstruction conditions is inputted. The reconstruction conditions include, as a reconstruction condition in accordance with the sorts of the operating frequencies, a condition specifying that "a common clock frequency should be used or clock frequencies should have a multiplied relation therebetween".

Next, in Step ST12, the reconstruction conditions inputted in Step ST11, data in a system component DB (database), and data in a design DB (database) are inputted and the possibility of combining circuits is automatically analyzed in accordance with constraints on the operating frequencies.

In the system component DB, clock frequencies inputted to the respective LSIs, the internal function blocks of the LSIs, the operating frequencies for internal logics (clock frequencies in use), and the like are stored. As an example of design know-how stored in the design DB, there is know-how about methods for reconstruction, block division, and the like using the same frequency.

The following are examples of items to be analyzed. So First, the respective operating frequencies of the LSIs are compared with each other and combinations of LSIs with the same frequencies are extracted.

FIG. 9(a) shows the respective operating frequencies of the LSI-A to LSI-E. From FIG. 9(a), it can be seen that a clock signal with a common operating frequency of 25 MHz is inputted to the LSI-A and the LSI-E and a clock signal with a common operating frequency of 33 MHz is inputted to the LSI-C and the LSI-D. The respective operating frequencies of the LSI internal blocks are also compared with each other such that the possibility of combining the blocks with the same frequencies is analyzed. This is because the internal blocks do not necessarily operate with the clock frequency inputted to the LSI containing the internal blocks and, in most cases, the inputted clock signal is mostly used after having its frequency divided or multiplied. In this example, it is assumed that the internal blocks a1, a2, b2, and e1 are found to operate with 75 MHz, the internal blocks c1, c2, and d2 are found to operate with 50 MHz, and the internal blocks b1, b3, d1, e2, and e3 are found to operate with 66 MHz, as shown in FIG. 9(b). Then, a NAND operation is performed between data on LSI-based combinations of operating frequencies and data on internal-block-based combinations of operating frequencies to analyze combinations of internal blocks that can be contained in shared LSIs. A method of using clocks in an optimum combination is re-examined and optimization (sharing of a clock generator between a plurality of clock lines, optimization of the clock lines, and the like) is performed. Then, a critical path (a system critical path and a critical path in each of the LSIs) in an optimum combinational circuit is detected.

As a result, system reconstruction is executed in Step ST13 to generate a system composed of a new LSIA' with an input clock of 25 MHz containing the internal blocks a1, a2, b2, and e1, a new LSI-B' with an input clock of 50 MHz containing the internal blocks c1, c2, and d2, and a new LSIC' with an input clock of 33 MHz containing the internal blocks b1, b3, d1, e2, and e3. When the reconstruction is executed, circuit synthesis on the software or RT level, simulation, automatic layout of the result of the synthesis, back-annotation of delay data extracted from the layout, and the like are performed, similarly to the first example.

Finally, the result of reconstruction is outputted in Step ST14. In the present example also, each of Steps ST11 to ST14 shown in FIG. 4 can be performed automatically, similarly to the first embodiment.

If memory size has redundancy, memory division can also be performed, though the description thereof is omitted in the present example.

The present example allows reconstruction of LSIs, while circumventing a crosstalk resulting from different clock frequencies.

In the first to fourth embodiments, the circuits and LSIs may be mounted separately on individual chips or may be mounted on a single chip as a system LSI.

EMBODIMENT 2

In the present embodiment, a description will be given to a design method for building or reconstructing a semiconductor integrated circuit device (an LSI or a system LSI, which will be simply referred to as a "system" hereinafter) by combining a plurality of circuits operating with different frequencies or non-synchronous and synchronous circuits in the individual examples thereof.

EXAMPLE 1

Figure 10:
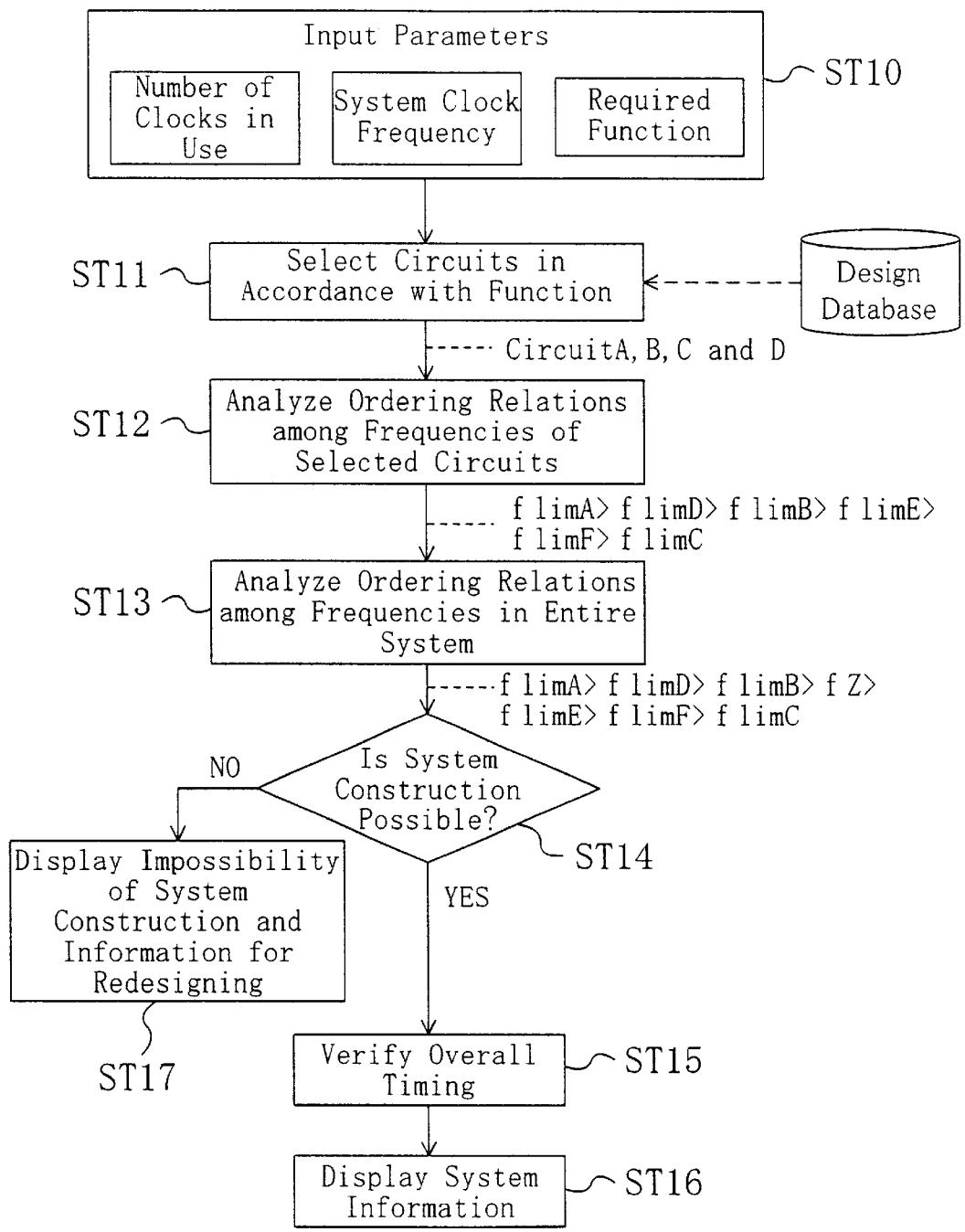
FIG. 10 is a flow chart illustrating a designing method in a first example of a second embodiment according to the present invention.
Figure 11:
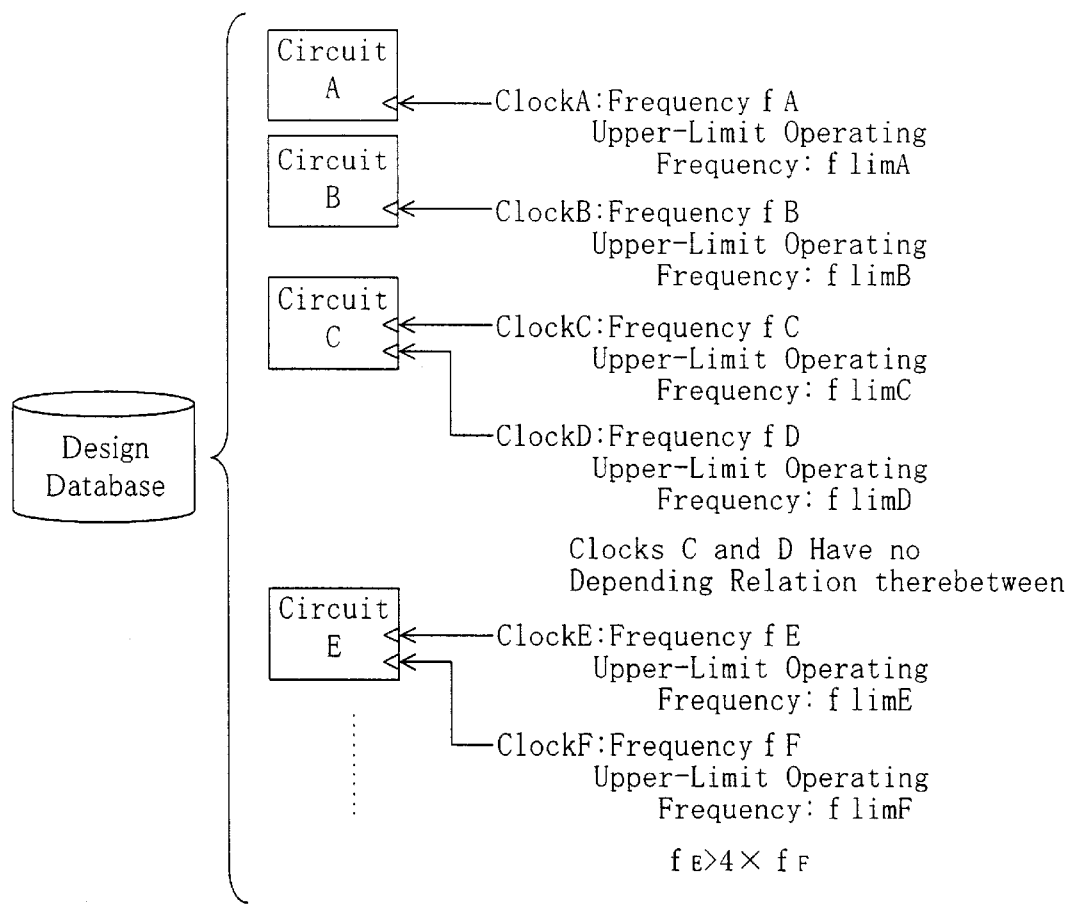
FIG. 11 shows data on existing circuits stored in a design database used in the first example of the second embodiment.

FIG. 10 is a flow chart illustrating a design method according to the present example. FIG. 11 shows data on existing circuits stored in a design database used in the present example.

As shown in FIG. 10, a method for reconstruction of the present example is implemented by using a design database storing therein data on the circuits A, B, C, and E as existing resources used for design. As shown in FIG. 11, data on the respective configurations of the circuits A, B, C, and E and on the clocks A to F is stored in the design database. The circuit A operates with the clock A having a clock frequency fA and an upper-limit operating frequency flimA. The circuit B operates with the clock B having a clock frequency fB and an upper-limit operating frequency flimB. The circuit C operates with the clocks C and D having clock frequencies fC and fD and upper-limit operating frequencies flimC and flimD. The circuit E operates with the clocks E and F having clock frequencies fE and fF and upper-limit operating frequencies flimE and flimF. Each of the circuits C and E uses two systems of clocks. The clocks C and D have no dependent relationship therebetween, while the clocks E and F have a dependent relationship of fE>4×fF therebetween.

Referring to the flow chart of FIG. 10 and FIG. 11, the method for reconstruction of the present example will be described.

First, in Step ST10, various parameters including the number of clocks in use which is the number of clock systems used in the system, the frequency of a clock used in the whole system to be designed (hereinafter referred to as a system clock frequency), and a required function which is a function required of the system are inputted. It is assumed here that only the clock Z is inputted as the number of clocks in use and the frequency of the clock Z, i.e., the system clock frequency is fZ. If the number of clocks in use is plural, however, there should be two system clock frequencies. The inputted parameters are stored in a parameter holder of a designing apparatus.

Next, the whole process advances to Step ST11 where data on the required function inputted in Step ST10 is fetched and data on the existing resources is fetched in the database so that circuits used to construct the system are selected and outputted in accordance with the function required of the system to be designed. It is assumed here that the circuits A, B, C, and E are selected.

Next, in Step ST12, the ordering relation among the upper-limit operating frequencies flimA to flimF of the respective clocks A to F used in the selected circuits A, B, C, and E is analyzed. As a result, it is assumed that the relation given by the following inequality (1):

$$\text{flimA} > \text{flimD} > \text{flimB} > \text{flimE} > \text{flimF} > \text{flimC} \qquad (1)$$

is established among the upper-limit operating frequencies flimA to flimF.

Next, the whole process advances to Step ST13 where the system clock frequency fZ inputted in Step ST10 is fetched such that the relation among the frequencies in the whole system is analyzed. Specifically, the ordering relation among the system clock frequency fZ and the respective upper-limit operating frequencies flimA to flimF of the selected circuits is determined. The reason for this is that there are cases where the system cannot be constructed by combining the circuits A to E depending on the relation among the system clock frequency and the respective upper-limit operating frequencies of the selected circuits. As a result, it is assumed that the relation given by the following inequality (2):

$$\text{flimA} > \text{flimD} > \text{flimB} > \text{fZ} > \text{flimE} > \text{flimF} > \text{flimC} \qquad (1)$$

is established among the system clock frequency fZ and the upper-limit operating frequencies flimA to flimF.

Next, in Step ST14, the relation given by the inequality (2) is fetched and the data on the number of clocks in use inputted in Step ST10 is extracted such that it is judged whether or not one system can be constructed by operating the individual circuits A, B, C, and E with one system of clock. If the construction of the system to be designed is possible, the whole process advances to Step ST15 where the timing of the whole system is verified and the whole process advances to Step ST16 where information on the constructed system is displayed.

If the frequencies have the relation given by the inequality (2) there among, the system operable with one system of clock cannot be constructed in the current state since there are the clocks E, F, and C having the upper-limit operating frequencies flimE, flimf, and flimC lower than the system clock frequency fZ. Accordingly, the construction of the system is judged impossible in Step ST14. Consequently, the whole process proceeds to Step ST17 where the statement that the construction of the system is impossible and information required for re-designing are displayed.

Figure 12:
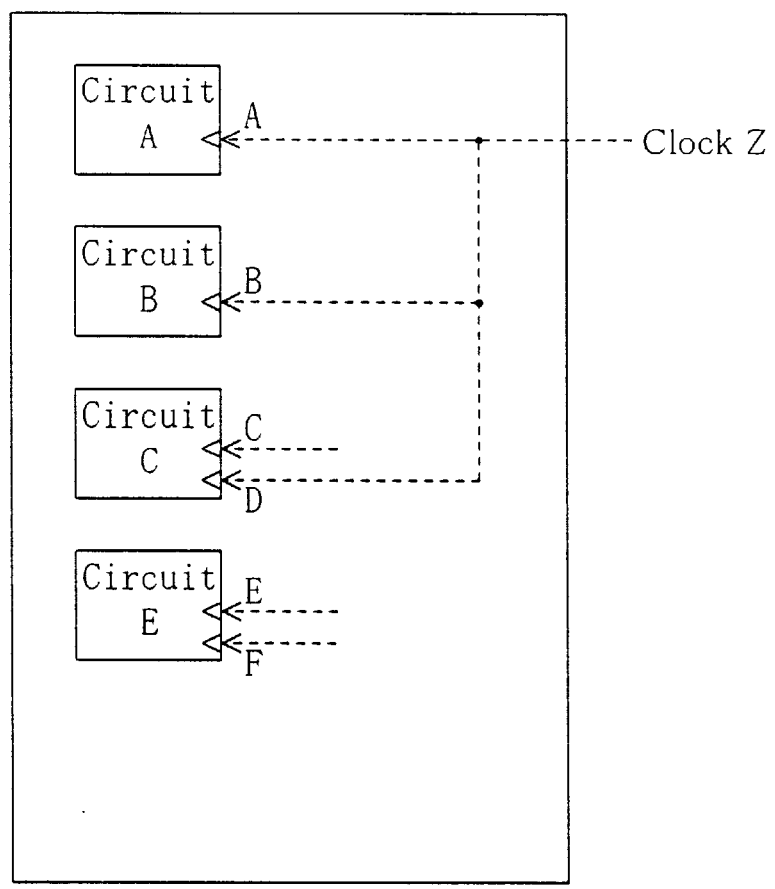
FIG. 12 shows an example of data necessary for re-designing in the first example of the second embodiment.

FIG. 12 shows an example of data required for re-designing. As shown in the drawing, it is displayed that not only the clock Z but also the three systems of clocks C, E, and F (or, alternatively, one system of clock for operating the three systems of clocks) are required. The relation given by the inequality (2) is also displayed at the same time.

If it is found in Step ST13 that the system clock frequency fZ and the upper-limit operating frequencies flimA to flimF have the relation given by the following inequality (3):

$$\text{flimA} > \text{flimD} > \text{flimB} > \text{flimE} > \text{flimF} > \text{flimC} > \text{fZ} \qquad (3),$$

each of the circuits A, B, C, and E is operable with the system clock frequency fZ. It follows therefore that data on the constructed system is outputted in Step ST16 of the flow chart shown in FIG. 10.

The present embodiment allows, if the circuits A, B, C, E are present as the existing resources and the respective clock frequencies (operating frequencies) of the circuits are different from each other, easy judgment of whether or not these circuits can be constructed into one system by using the specified clock. The present embodiment also allows each of the steps to be performed automatically except for the inputting of design specifications. However, each of the steps need not necessarily be performed automatically.

It is also possible to simplify the clock system of an existing system by using the design method of the present example.

EXAMPLE 2

Figure 13:
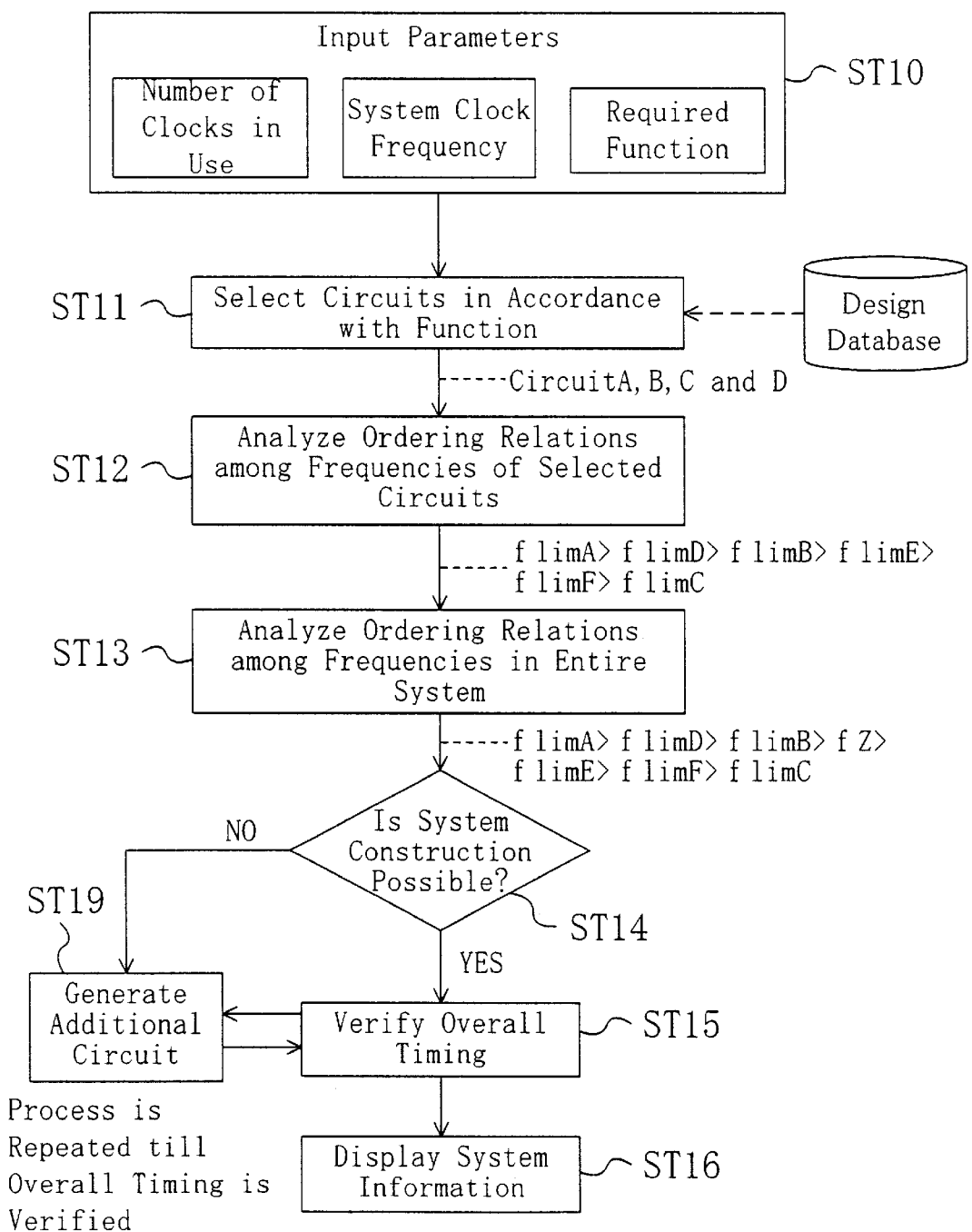
FIG. 13 is a flow chart illustrating a designing method in a second example of the second embodiment.

FIG. 13 is a flow chart illustrating a design method of the present example. In the present example also, it is assumed that a design database stores therein the data shown in FIG. 11. Referring to the flow chart of FIG. 13, the method of designing a system according to the present example will be described.

In the present example also, the processes of Steps ST10 to ST16 are performed, similarly to the first example.

If the construction of the system is judged impossible in Step ST14, the whole process proceeds to Step ST17 where additional circuits are generated. That is, the additional circuits are generated for the clock C of the circuit C and the clocks E and F of the circuit E, which cannot be operated with the system clock Z as is apparent from the relation given by the inequality (2).

Figure 14:
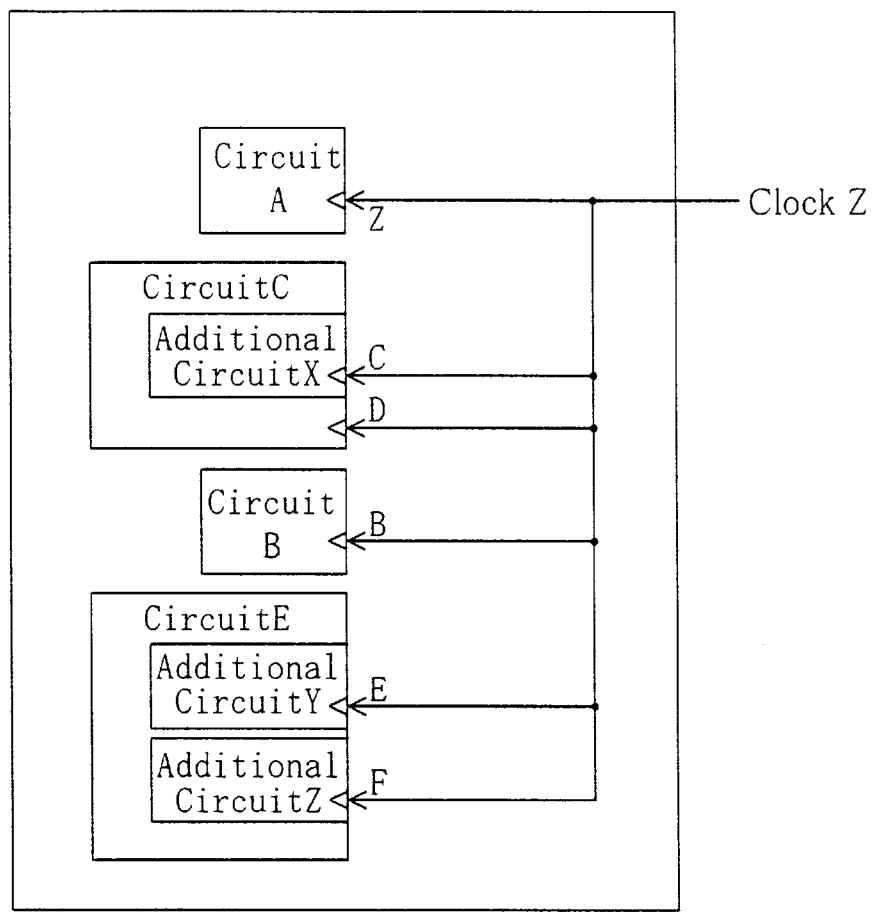
FIG. 14 shows an example of a post-design structure of a system in the second example of the second embodiment.
Figure 15:
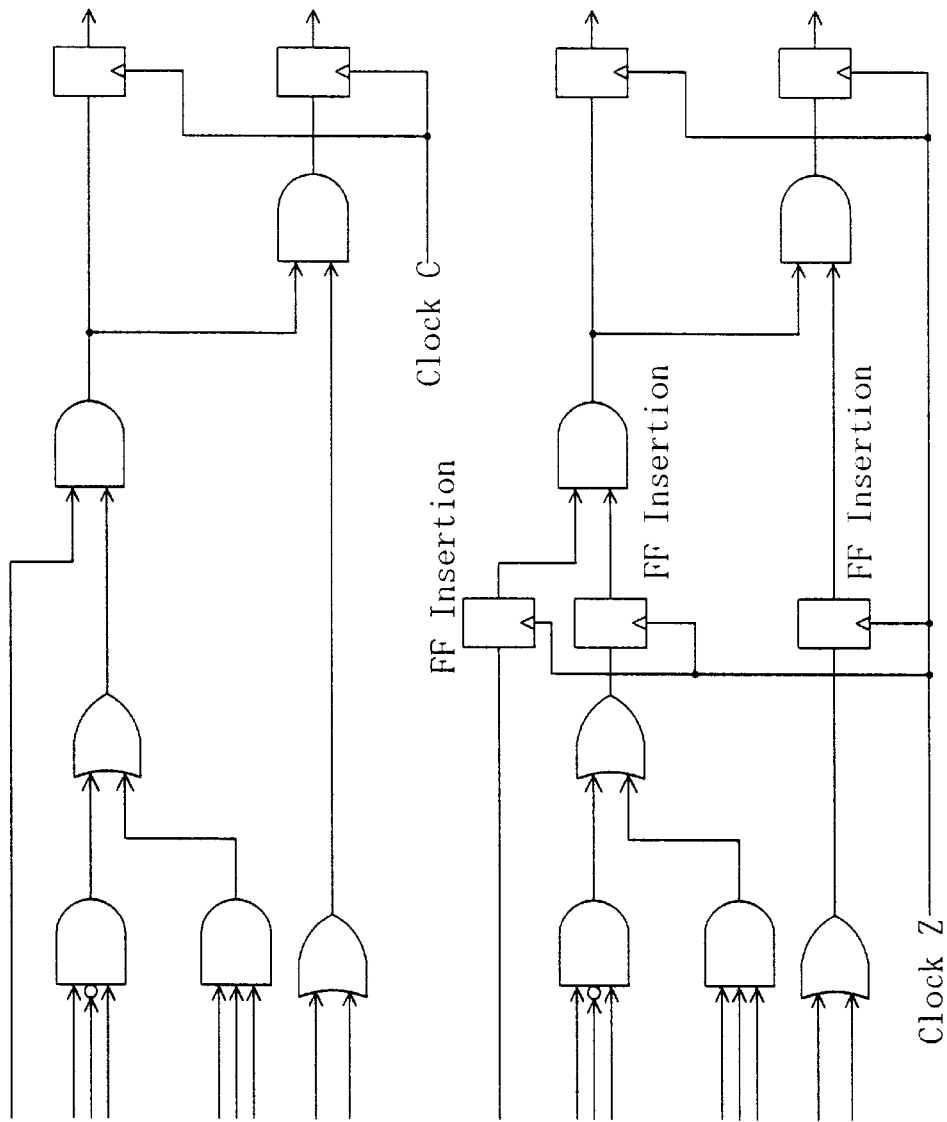
FIG. 15(a) is a circuit diagram showing a current configuration of a circuit stored in a design database in the second example of the second embodiment and FIG. 15(b) shows a circuit after the generation of additional circuits.

FIG. 14 shows an example in which the additional circuit X is provided in the circuit C and the additional circuits Y, Z are provided in the circuit E. FIG. 15(a) is a circuit diagram showing the current configurations of the circuits (such as the circuits C and E) stored in a design database and FIG. 15(b) shows circuits after the generation of the additional circuits. As shown in FIG. 15(b), the flip-flops for adjusting a shift in operation timings due to a difference between the system clock frequency fZ and each of the clock frequencies fC, fE, and fF of the clocks C, E, and F are placed appropriately. This allows each of the circuits C, E to operate at a high speed in response to the clock Z.

If the system clock frequency fZ is an integral multiple of the clock frequency fC, fE, fE, or the like, a frequency divider with or without a doubler is disposed at a portion to which the clock C, E, or F is inputted, which causes the circuit C or E to function as a synchronous circuit and ensures normal operation of each of the circuits.

Then, in Step ST15, additional circuits are provided or removed till the timing is verified. Finally, if normal operation timings of the respective circuits are retained finally, the whole process advances to Step ST16.

In addition to the effects achieved by the first example, the present example achieves the effect of enabling construction of a new system by automatic generation of additional circuits and reconstruction of an existing system.

EMBODIMENT 3

A description will be given to a third embodiment associated with a method of reconstructing or designing processor circuits by using the result of analyzing a micro-code composed of a micro-instruction sequence for controlling the processors. In the present embodiment, the description will be given in particular by using, as an example, a method of reconstructing processors partly composing an image compressing system based on a micro-code.

EXAMPLE 1

Figure 16:
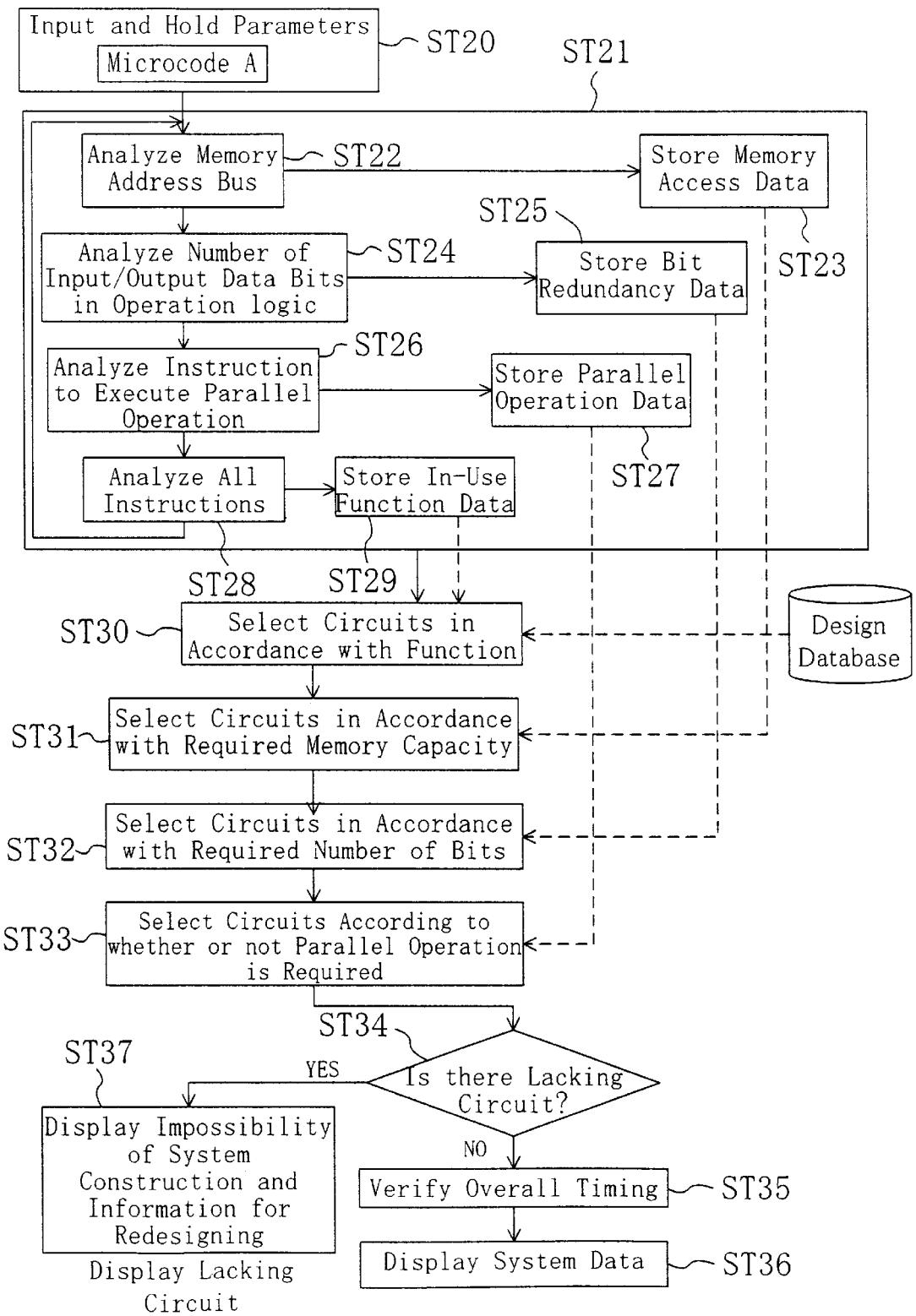
FIG. 16 is a flow chart showing the procedure of reconstructing a processor circuit (designing method) in a first example of a third embodiment according to the present invention.
Figure 17:
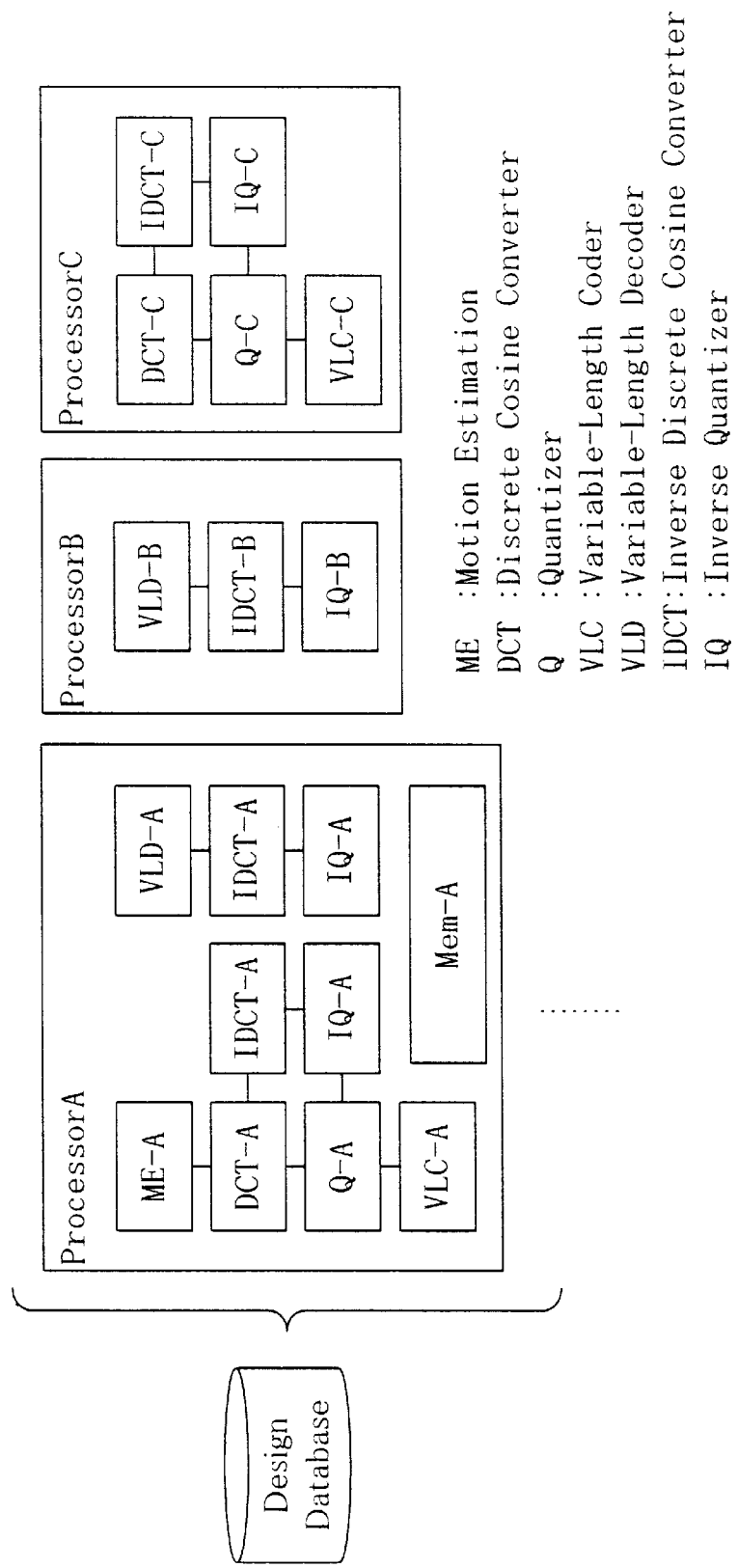
FIG. 17 shows data on a processor stored in a design database used for designing in the third embodiment.

FIG. 16 is a flow chart illustrating the procedure of a method of reconstructing processor circuits (design method) in a first example of the present embodiment. FIG. 17 shows data on processors stored in a design database used for design in the present embodiment.

As shown in FIG. 17, data on the, contents of the processors A, B, and C usable as existing resources is stored in the design database used in the present embodiment. Here, the processor A for compressing/decompressing a dynamic image, the processor B for decompressing a dynamic image, and the processor C for processing a still image, each of which reconstructs a part of the image processing system, are stored. It is assumed that the image processing system has various other circuits of any types depending on the type thereof. In the processor A, there are disposed, as a group of circuit engines for image compression, a motion estimation ME-A, a discrete cosine transformer DCT-A, a quantizer Q-A, a variable-length coder VLC-A, an inverse discrete cosine transformer IDCT-A, and an inverse quantizer IQ-A. As a group of circuit engines for image decompression, there are also disposed a variable-length decoder VLD-A, an inverse discrete cosine transformer IDCT-A, and an inverse quantizer IQ-A. There is also provided an operation region Mem-A for the groups of circuit engines. In the processor B, there are disposed a group of circuit engines for performing only a decompressing process, which are a variable-length decoder VLD-B, an inverse discrete cosine transformer IDCT-B, and an inverse quantizer IQ-B. In the processor C, there are disposed a group of circuit engines for performing only a compressing process, which are a motion estimation ME-C, a discrete cosine transformer DCT-C, a quantizer Q-C, a variable-length coder VLC-C, an inverse discrete cosine transformer IDCT-C, and an inverse quantizer IQ-C. In the groups of circuit engines, the number of bits required for an operation has different degrees of bit redundancy even in the circuit engines having the same function, depending on the processors in which they are disposed.

Referring to FIG. 17 and in accordance with the flow of FIG. 16, the method of circuit reconstruction according to the present example will be described.

First, in Step ST20, parameters desired by the designer as design specifications are inputted. In this example, it is assumed that reconstruction of the processors A, B, and C into a circuit having all the functions of the processors A, B, and C using a micro-code A (a program for controlling the processor A) which contains a micro-instruction sequence for controlling the processor A has been inputted as parameters. As parameters to be inputted, various types can be selected. For example, parameters can be inputted in response to a request specifying the removal of excess speculations of the processor A to provide a simple structure.

Next, in Step ST21, the content of the design database is fetched and the operation of the processor is simulated by using the micro-code A. In Step ST21, simulation is performed by the following procedure.

After a memory address bus is analyzed in Step ST22, the result of analysis is stored as memory access data in Step ST23. At this time, the address bus of the memory is monitored such that an address space being accessed is detected.

Next, in Step ST24, the number of input/output data bits is analyzed based on the maximum and minimum values in operation logic. The result of analysis is stored as bit redundancy data in Step ST25. At this time, input/output data to and from an operating device is monitored and the permissible range of values is detected such that the degree of redundancy of the number of bits is determined.

Next, in Step ST26, a parallel operation instruction is analyzed and the result of analysis is stored as parallel operation data in Step ST27. At this time, it is detected whether or not there are blocks operating simultaneously in response to an activation instruction to each of function blocks so that the necessity for parallel operation is determined.

Then, in Step ST28, the foregoing process is performed repeatedly till the analyses of all the instructions are completed. Thereafter, in Step ST29, the results of analyses are stored as in use function data.

Then, in Step ST30, descriptions and the in-use function data in the design database are fetched and circuit selection according to the function is performed. At this time, all the circuits conforming to the function are selected. As for memories, a selection is made by neglecting the capacities thereof.

Next, in Step ST31, the memory access data is fetched and circuit selection according to the required memory capacity is performed. At this time, a memory having a capacity not less than and closest to the required memory capacity is selected from among the circuits selected in Step ST30, while the other circuits are removed.

Then, in Step ST32, bit redundancy data is fetched and circuit selection according to the required number of bits is performed. At this time, a circuit having a number of bits not less than and closest to the required number of bits is selected from among the circuits selected in Step ST31, while the other circuits are removed.

Then, in Step ST33, the content of the parallel operation data is fetched and circuit selection according to whether or not parallel operations are necessary is performed. If the circuits remaining after Step ST32 include a plurality of circuits which have the same function and do not perform parallel operations, only one of them is selected, while the other circuits are removed.

Thereafter, the whole process advances to Step S34 where it is judged whether or not there is a lacking circuit. If there is no lacking circuit, the whole process advances to Step ST35 where the timing of the whole system is verified and to Step ST36 where data on the constructed system is displayed.

If a circuit (function) enclosed in the broken rectangle shown in FIG. 18 is lacking, a system cannot be constructed in the current configuration, so that it is judged in Step ST34 that there is a lacking circuit. Accordingly, the whole process advances to Step ST37 where the statement that the construction of a system is impossible and information required for re-designing are displayed.

According to the present example, if the processors A, B, and C as exiting resources are present and circuit generation or reconstruction corresponding to the micro-code is to be performed, the judgment of whether or not the generation or reconstruction is possible can be performed automatically by analyzing the micro-code including an instruction code for controlling the processors. The present example also allows easy adoption of a method of satisfying the requirement by displaying data on a process required to perform desired generation or reconstruction and the like.

EXAMPLE 2

Figure 19:
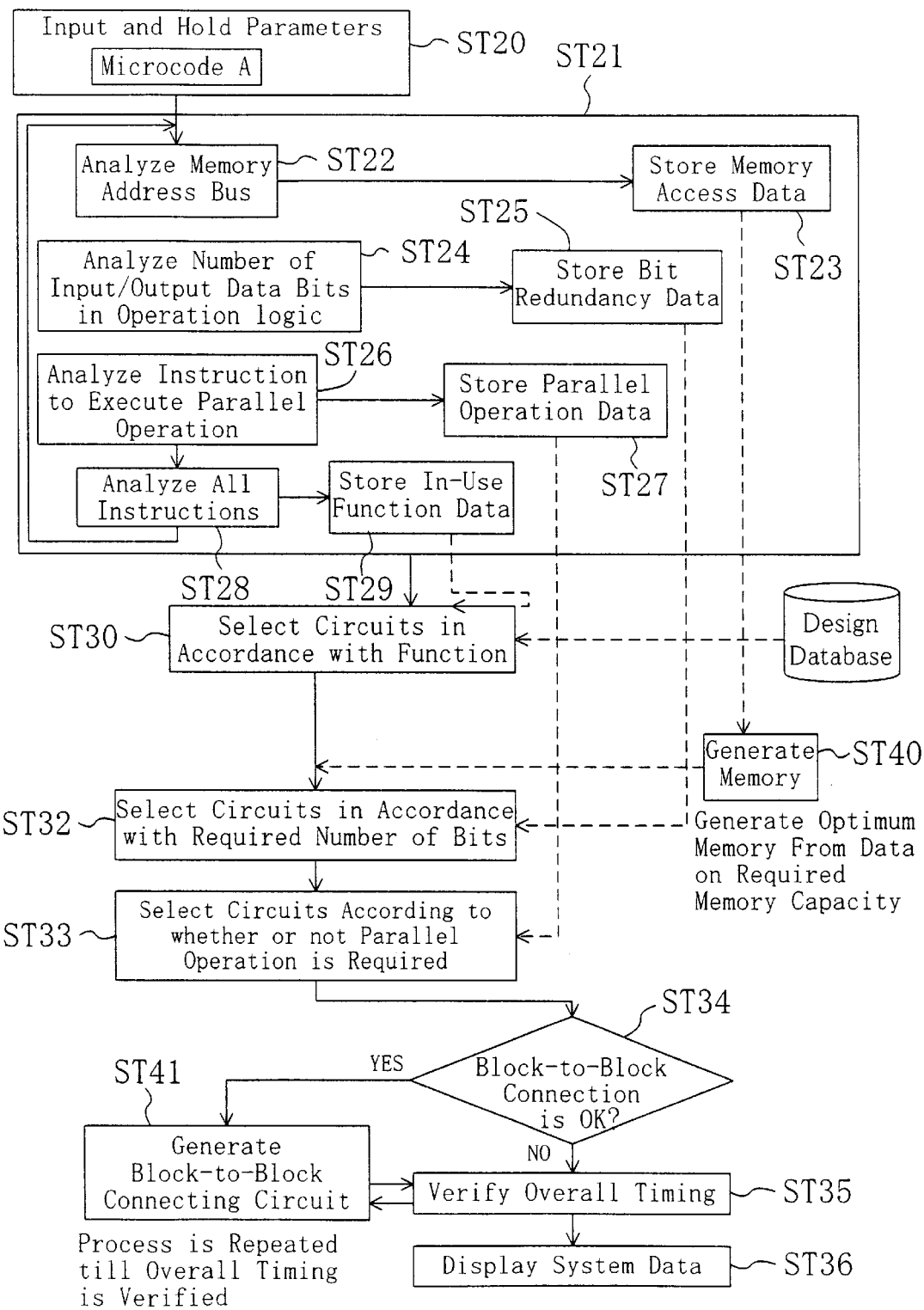
FIG. 19 is a flow chart illustrating a designing method in a second example of the third embodiment.

FIG. 19 is a flow chart illustrating a designing method in the present example. In the present example also, it is assumed that a design database stores therein the data shown in FIG. 17. Referring to the flow chart of FIG. 19, the method of designing a system in the present embodiment will be described.

In the present example also, the processes of Steps ST20 to ST30 are performed, similarly to the first example. However, the process of Step ST16 of FIG. 16 is not performed in the present example.

Then, in Step ST40, the memory access data stored in Step S23 is fetched so that an optimum memory is generated.

Then, in Step ST32, bit redundancy data and the optimum memory are fetched and circuit selection according to the required number of bits is performed. At this time, the circuit having a number of bits not less than and closest to the required number of bits is selected from among the circuits selected in Step ST30, while the other circuits are removed. Thereafter, the same processes as performed in the first example are performed in Steps ST33 to ST36. If the construction of a system is judged impossible in Step ST34 of the present example, the whole process proceeds to Step ST14 where additional circuits are generated. Then, the timing of the whole system is verified in Step ST35. The circuit generation in Step ST41 and the timing verification in Step ST35 are performed repeatedly till the timing of the whole system is verified.

Figure 20:
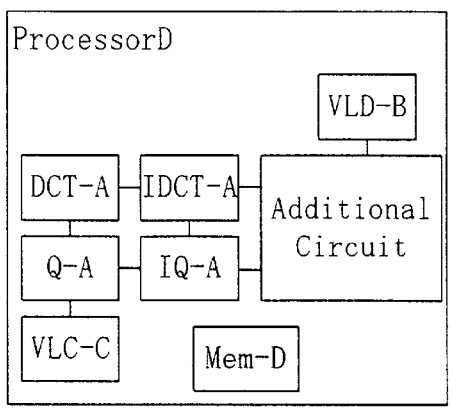
FIG. 20 is a block circuit diagram schematically showing a structure of a new processor D generated in the second example of the third embodiment.

FIG. 20 is a block circuit diagram schematically showing a structure of a new processor D generated in the present example. As shown in the drawing, the motion compensating circuit ME-A disposed in the processor A is judged to be an unnecessary circuit for the processor D so that it is removed. In the processor D, the variable-length coder VLC-C of the processor C is disposed in place of the variable-length coder VLC-A of the processor A and the variable-length decoder VLD-B of the processor B is disposed in place of the variable-length decoder VLD-A of the processor A. In place of the operation region Mem-A, an operation region Mem-D having a smaller memory capacity is provided. Since it is unnecessary to perform the data compression process and the data decompressing process in parallel as in the processor A and there are no parallel operations among the processors A, B, and C, the respective functions of the group of circuit engines for the data decompressing process in the processor A and the groups of engines in the processors B and C are entirely incorporated into the processor D.

If there are the processors A, B, and C as existing resources, the present example allows the respective functions of the processors A, B, and C to be integrated into the newly generated circuit D (processor) by analyzing the micro-code including an instruction code for controlling the processors.

It is also possible to reconstruct each of the processors by individually removing the excessive functions therefor.

EMBODIMENT 4

A fourth embodiment associated with a method of judging the implementability of a required function in a combination of circuit components that has been set will be described in the individual examples thereof.

EXAMPLE 1

Figure 21A:
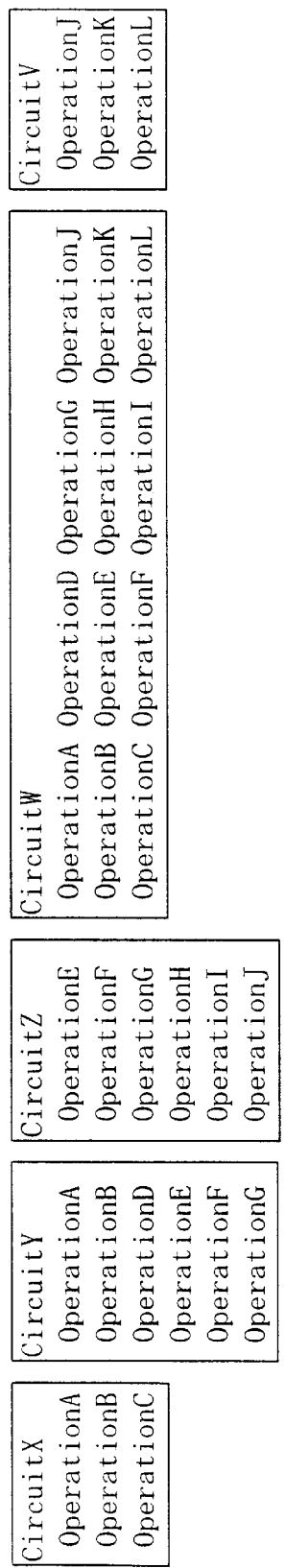
FIGS. 21(a) and 21(b) illustrate a method of judging the implementability of a required function in a first example of a fourth embodiment according to the present invention.
Figure 21B:
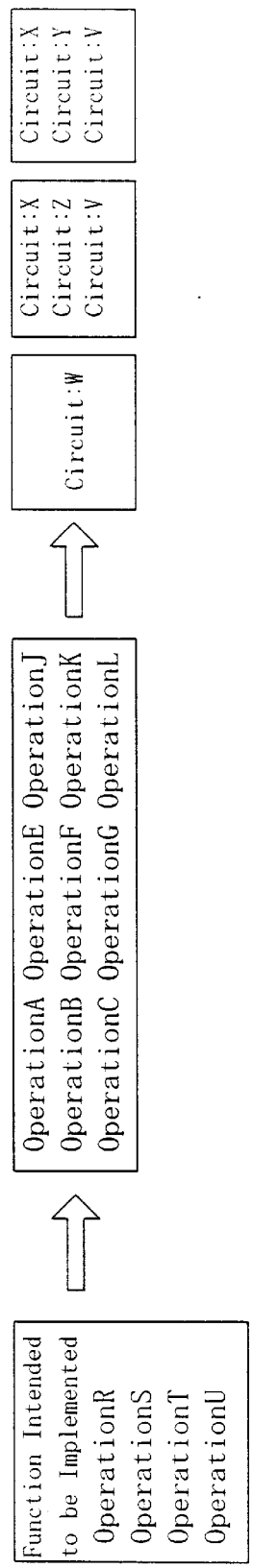

FIGS. 21(a) and 21(b) are views for illustrating the method of judging the implementability of a required function in the first example.

First, if there are circuits X, Y, Z, W, and V as shown in FIG. 21(a), operations required by each of the circuits are stored therein. For example, it is assumed that the operations A, B, and C are stored in the circuit X, the operations A, B, D, E, F, and G are stored in the circuit Y, the operations E, F, G, H, I, and J are stored in the circuit Z, the operations A, B, C, D, E, F, G, H, I, J, K, and L are stored in the circuit W, and the operation J, K, and L are stored in the circuit V.

On the other hand, it is assumed that functions R, S, T, and U required by the designer to be implemented (required functions) have been inputted, as shown in FIG. 21(b). At this time, the functions R, S, T, and U are automatically compiled in a combination of operations. As a consequence, it is assumed that the functions R, S, T, and U are found to be implementable with a combination of the operations A, B, C, E, F, G, J, K, and L. Accordingly, a single circuit or a combination of a plurality of circuits containing the operations A, B, C, E, F, G, J, K, and L are automatically retrieved. In this example, the required function can be implemented by the single circuit W, by a combination of the plurality of circuits X, Z, and V, or by the plurality of circuits X, Y, and V and the statement that the required function is implementable is displayed automatically. If the required function cannot be implemented, on the other hand, the statement that the required function is not implementable is displayed.

The present example allows the required function to be retrieved automatically based on the types of the operations and the possibility of generation of a new circuit to be judged promptly by using data on circuits as existing resources.

EXAMPLE 2

Figure 22:
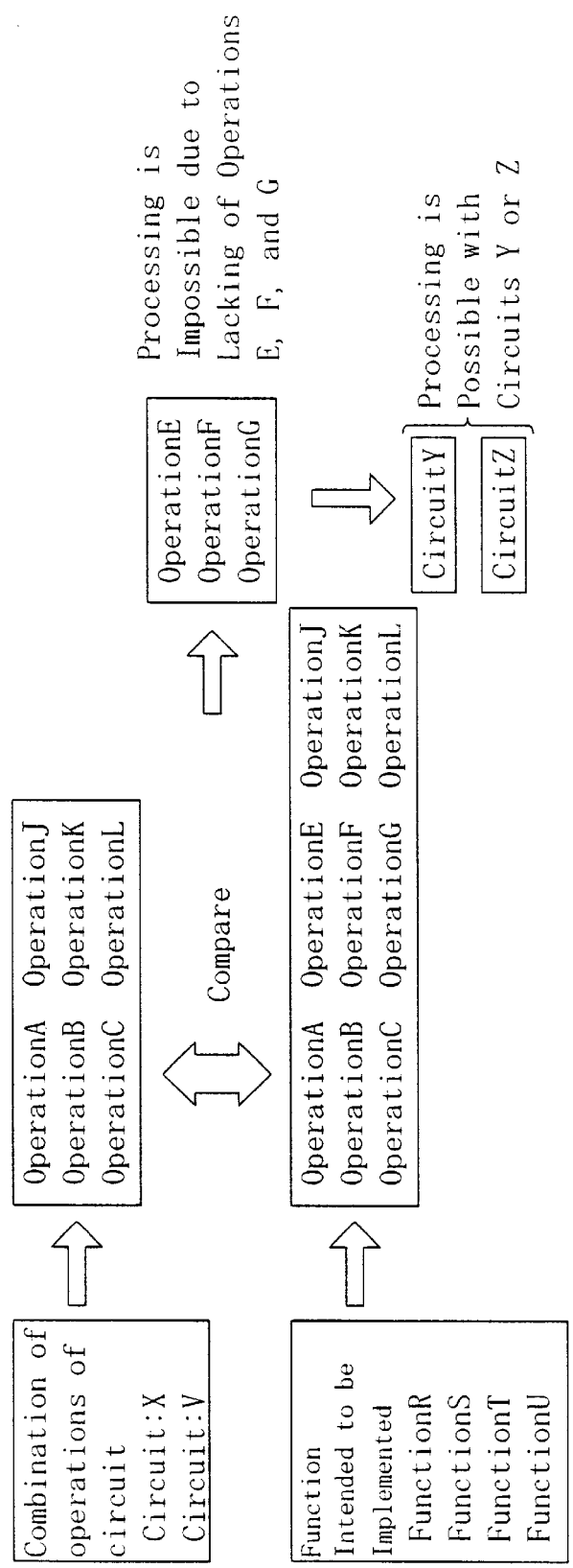
FIG. 22 illustrates a method of judging the implementability of a required function in a second example of the fourth embodiment.

FIG. 22 illustrates a method of judging the implementability of a required function in a second example.

In the present example also, it is assumed that the circuit X for executing the operations A, B, and C, the circuit Y for executing the operations A, B, D, E, F, and G, the circuit Z for executing the operations E, F, G, H, I, and J, the circuit W for executing the operations A, B, C, D, E, F, G, H, I, J, K, and L, and the circuit V for executing the operations J, K, and L are stored in a database, as shown in FIG. 21(a).

It is also assumed that the functions R, S, T, and U required by the designer to be implemented have been inputted. It has been found that, if the functions R, S, T, and U to be implemented (required functions) are automatically compiled in a combination of operations, the functions R, S, T, and U an be implemented with a combination of the operations A, B, C, E, F, G, J, K, and L. At this time, a proper single circuit or a proper combination of a plurality of circuits are determined preliminarily. In this example, it is assumed that the circuits X and V have been stored. At this time, the statement that the operations A,B, C, J, K, and L can be executed with a combination of the circuits X and V. By comparing the operations A, B, C, J, K, and L which can be implemented with the combination of the circuits X and V with the operations A, B, C, E, F, G, J, K, and L necessary to implement the required functions R, S, T, and U, it is automatically derived that execution is impossible because the operations E, F, and G are lacking and a combination of circuits capable of executing the lacking operations E, F, and G is further searched. As a result, the statement that the required function can be implemented with the circuit Y or Z is displayed in this example.

If there is an operation lacking to implement the required function, the present example' inputs a proper circuit which can be assumed to satisfy the required function such that the operation is derived automatically and a circuit necessary to implement the require function is searched automatically. This allows a new circuit to be generated promptly by using data on circuits as exiting resources.

EXAMPLE 3

Figure 23A:
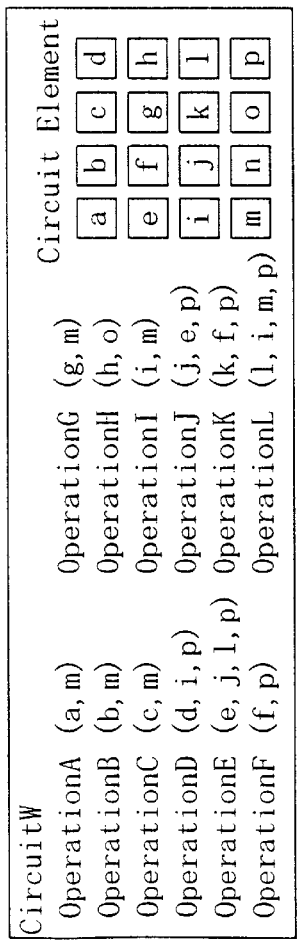
FIGS. 23(a) and 23(b) illustrate a method of judging the implementability of a required function in a third example of the fourth embodiment.
Figure 23B:
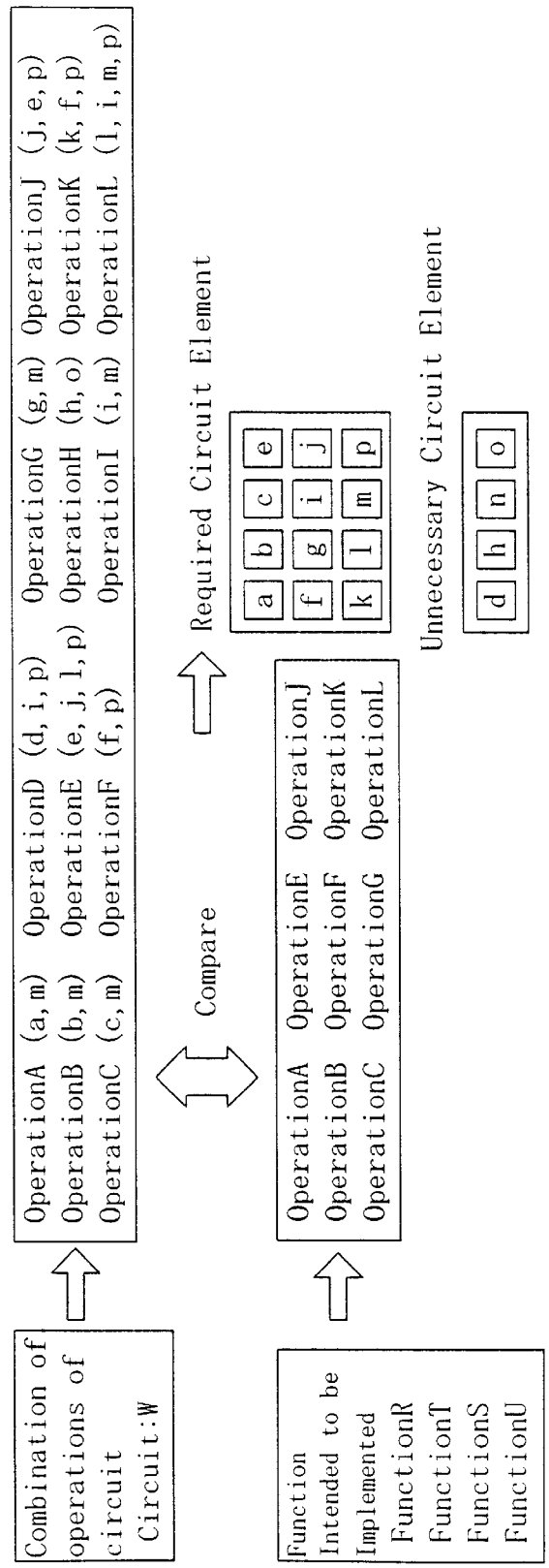

FIGS. 23(a) and 23(b) illustrate a method of judging the implementability of a required function in a third example.

First, if there is a circuit W as shown in FIG. 23(a), operations required by each of circuits and circuit elements required to execute the operations are stored therein. For example, the operations A, B, C, D, E, F, G, H, I, J, K, and L are stored in the circuit W. It is assumed that the operation A can be executed with the circuit elements a and m, the operation B can be executed with the circuit elements b and m, the operation C can be executed with the circuit elements c and m, the operation D can be executed with the circuit elements d, i, and p, the operation E can be executed with the circuit elements e, j, l, and p, the operation F can be executed with the circuit elements f and p, the operation G can be executed with the circuit elements g and m, the operation H can be executed with the circuit elements h and o, the operation I can be executed with the circuit elements i and m, the operation J can be executed with the circuit elements j, e, and p, the operation K can be executed with the circuit elements k, f, and p, and the operation L can be executed with the circuit elements l, i, m, and p. Then, all the circuit elements a to p necessary to execute the operations A to L are stored.

It is also assumed that the functions R, S, T, and U required by the designer to be implemented have been inputted. It has been found that, if the functions R, S, T, and U to be implemented (required functions) are complied automatically in a combination of operations, the functions R, S, T, and U can be implemented with a combination of the operations A, B, C, E, F, G, J, K, and L, similarly to the first embodiment. At this time, a proper single circuit or a proper combination of a plurality of circuits are determined to implement the function to be implemented. In this example, it is assumed that the circuit W has been set. By comparing the circuit elements stored in the operations A, B, C, D, E, F, G, H, I, J, K, and L within the circuit W with the circuit elements contained in the operations A, B, C, E, F, G, J, K, and L necessary to implement the required functions R, S, T, and U, the necessary circuit elements and the unnecessary circuit elements are outputted distinguishably.

The present example determines necessary hardware resources and unnecessary hardware resources for hardware which is the circuit elements for executing the operations for implementing a function of the circuit. That is, of the circuit elements of existing circuits, the ones necessary and unnecessary to satisfy the required function are detected automatically by extracting, from a database or the like, the existing circuits to be used to implement the required function. This removes the unnecessary circuit elements in generating a new circuit conforming to the required function by using the existing hardware resources and thereby simplifies the semiconductor integrated circuit device.

EMBODIMENT 5

In the present embodiment consisting of a plurality of examples, a description will be given to a method of using only a part of existing IPs in designing a semiconductor integrated circuit device (specifically, an LSI or a system LSI) termed new IPs and blocks by using the IPs and design data which are existing resources.

In the case of using existing design data and IPs, it has conventionally been difficult to generate new IPs or the like by extensively using the function of only a part of the existing design data and IPs since it has been necessary to use them by connecting a signal to the external pins thereof.

To eliminate the difficulty, the present embodiment withdraws external pins from the internal nodes of the existing design data and IPs such that the function of a part of the existing design data and IPs is used extensively. The method of using the function of only a part of the existing design data and IPs according to the present embodiment will be described in the following individual examples thereof.

EXAMPLE 1

In the present example, a method of organizing data on existing IPs into a hierarchical configuration and storing the hierarchical data in a database will be described first.

Figure 24:
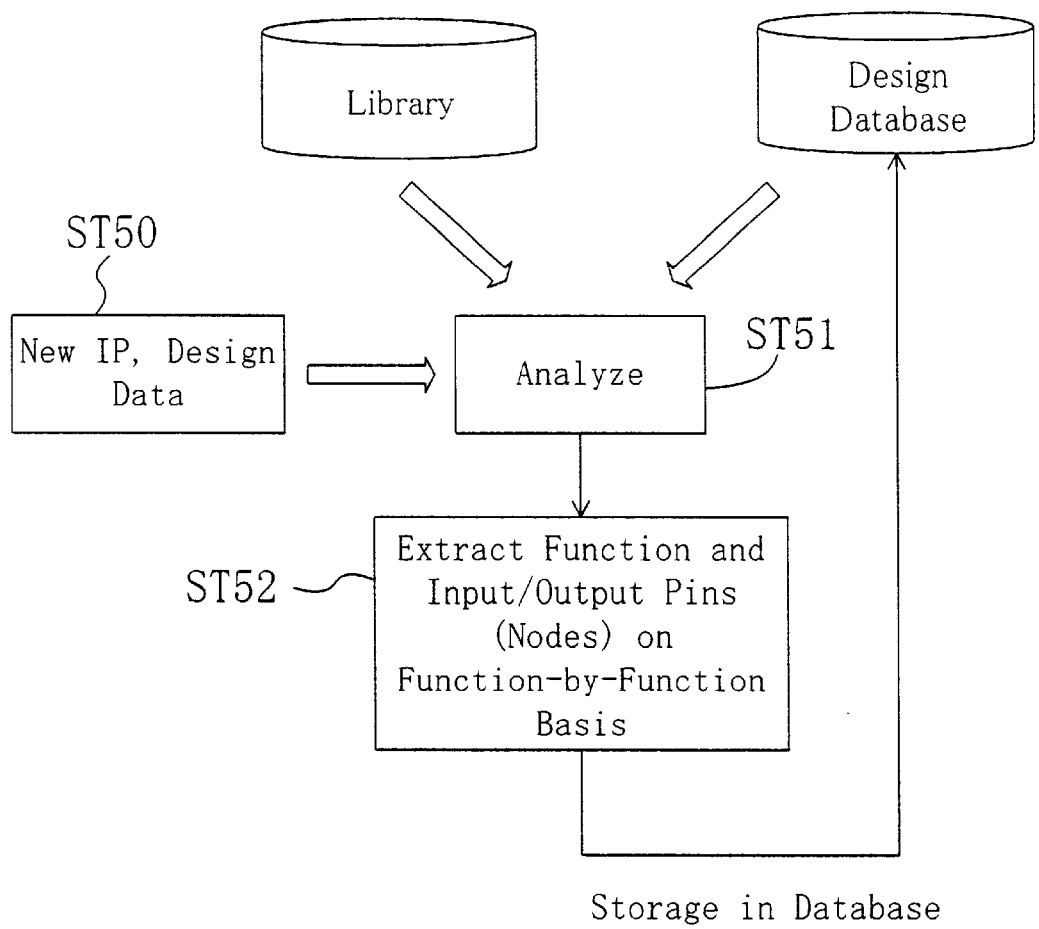
FIG. 24 is a flow chart illustrating the procedure of storing function-by-function internal node data in a database in the first example of the fourth embodiment.

FIG. 24 is a flow chart illustrating the procedure of storing function-by-function internal node (pin) data in the database to withdraw the internal nodes to the outside. As shown in the drawing, if new IPs and design data to be designed are inputted in Step ST50, the whole process advances to Step ST51 where data in a design database storing therein data on existing IPs and in a library storing therein data on hardware resources and the like is stored is fetched and an analysis is made whereby inputs/outputs corresponding to the functional hierarchy of the new IPs and design data are extracted by using the data. Then, in Step ST52, functions are extracted from inside the design database and input/output pins (nodes) are also extracted therefrom on a function-by-function basis. Data on the extracted functions and input/ output pins (nodes) is organized into a hierarchical configuration and stored in the design database. An example of the data stored in the database will be described in detail later.

Figure 25:
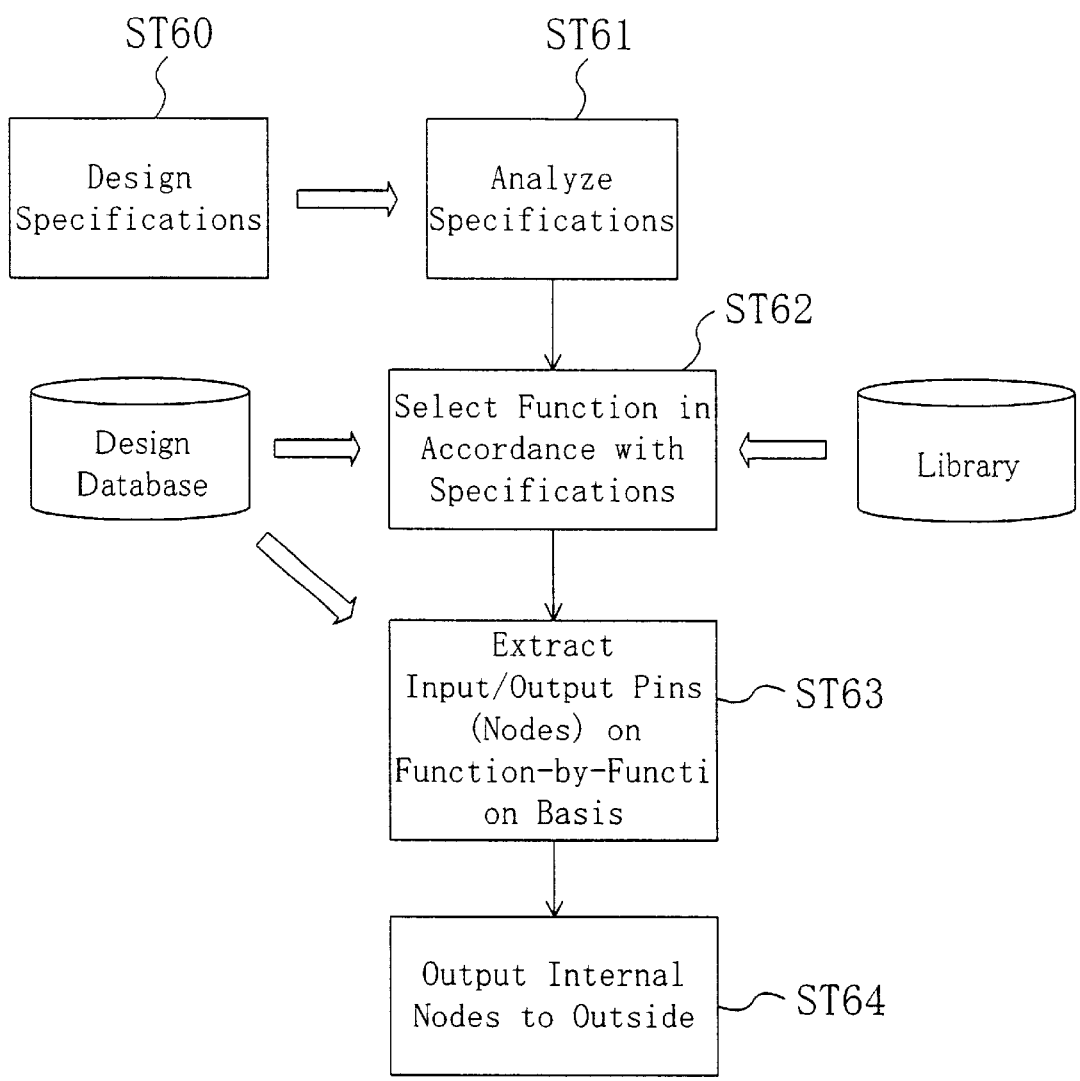
FIG. 25 is a flow chart illustrating the procedure of extracting an internal node to the outside in the first example of the fourth embodiment.

FIG. 25 is a flow chart showing the procedure of extracting the internal nodes to the outside in order to generate new IPs and the like by using the data on the internal nodes and the like stored in the database.

First, design specifications are inputted in Step ST60 and analyzed in Step ST61. Then, in Step ST62, data in the design database and in the library is fetched such that functions in accordance with the specifications are selected therefrom. Then, in Step ST63, input/output pins (nodes) are extracted on a function-by-function basis. The internal nodes are outputted as external pins in Step ST64.

Figure 26:
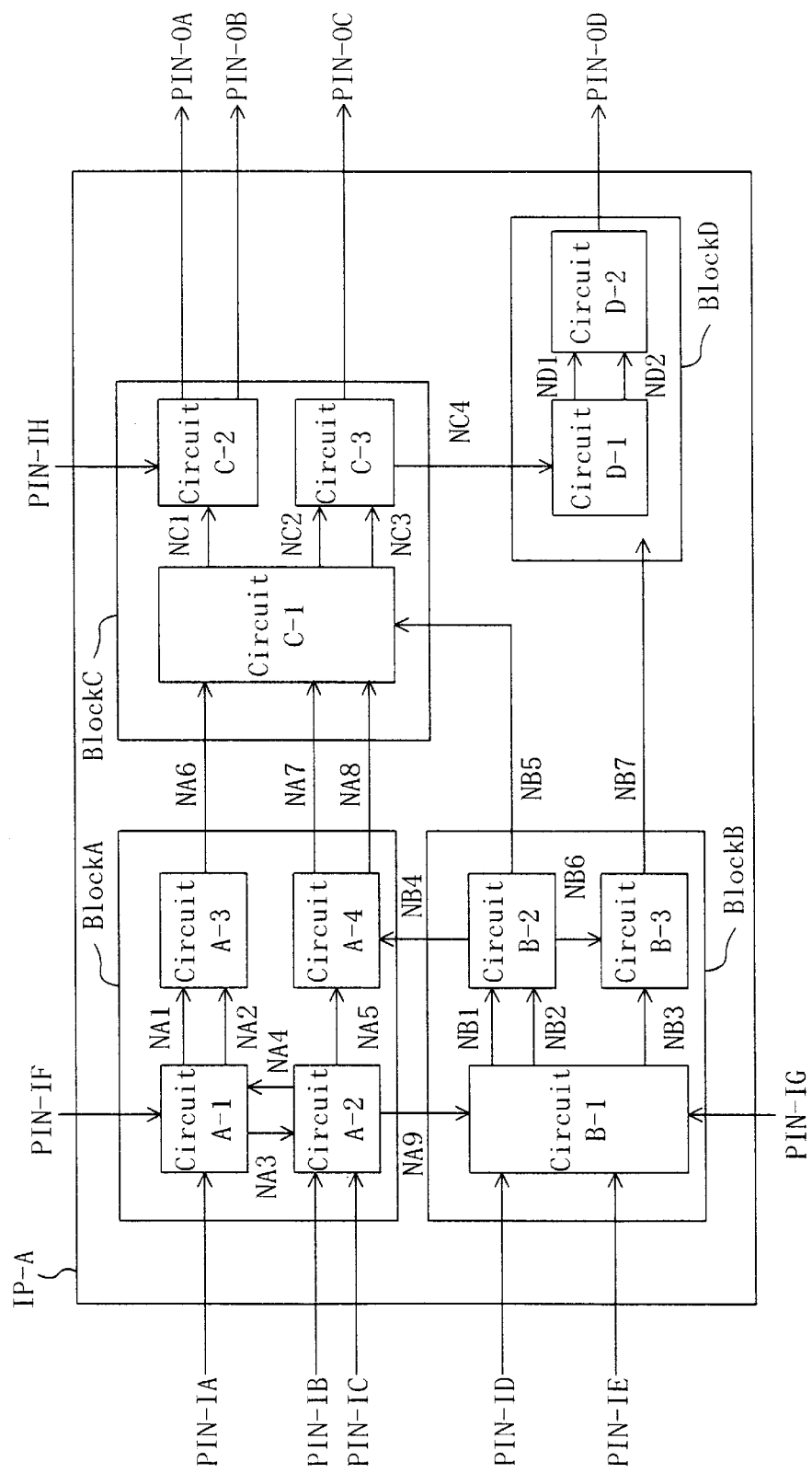
FIG. 26 shows an example of IP stored in a design database in the first example of the fourth embodiment.

FIG. 26 shows an example of the IPs stored in the design database. In the IP-A, the blocks A to D are disposed. In each of the blocks A to D, an internal circuit (such as A-1) and the like are disposed. The respective input pins PIN-IA to PIN-IH of the internal circuits, the respective output pins PIN-OA to PIN-OD thereof, and the internal nodes NA1 to ND2 in the IP-A are stored in the design database. FIG. 27 is a list of data on the IP-A stored in the design database. As shown in the drawing, the blocks A to D contained in the IP-A and the respective functions of the blocks A to D are stored. The external pins and the internal nodes which have been sorted out according to the individual functions are also described. The external pins have been further sorted into input pins and output pins, while the internal nodes have been sorted into input-side nodes and output-side nodes. Similar data has also been stored on another IP such as IP-B.

By thus storing the internal functions of the IP in a hierarchical configuration, retrieval from a lower-level layer can be performed in re-using the existing IP.

Next, a description will be given to a method of designing a semiconductor integrated circuit device (such as an LSI, a system LSI, or a circuit) employing some of circuits (blocks) in the IP with the use of the database storing therein data on the internal nodes. The method has been roughly subdivided into two types, which will be described individually.

EXAMPLE 2

In a second example, a method of using some of the blocks in the IP, while maintaining the structure of the entire IP, will be described.

Figure 28:
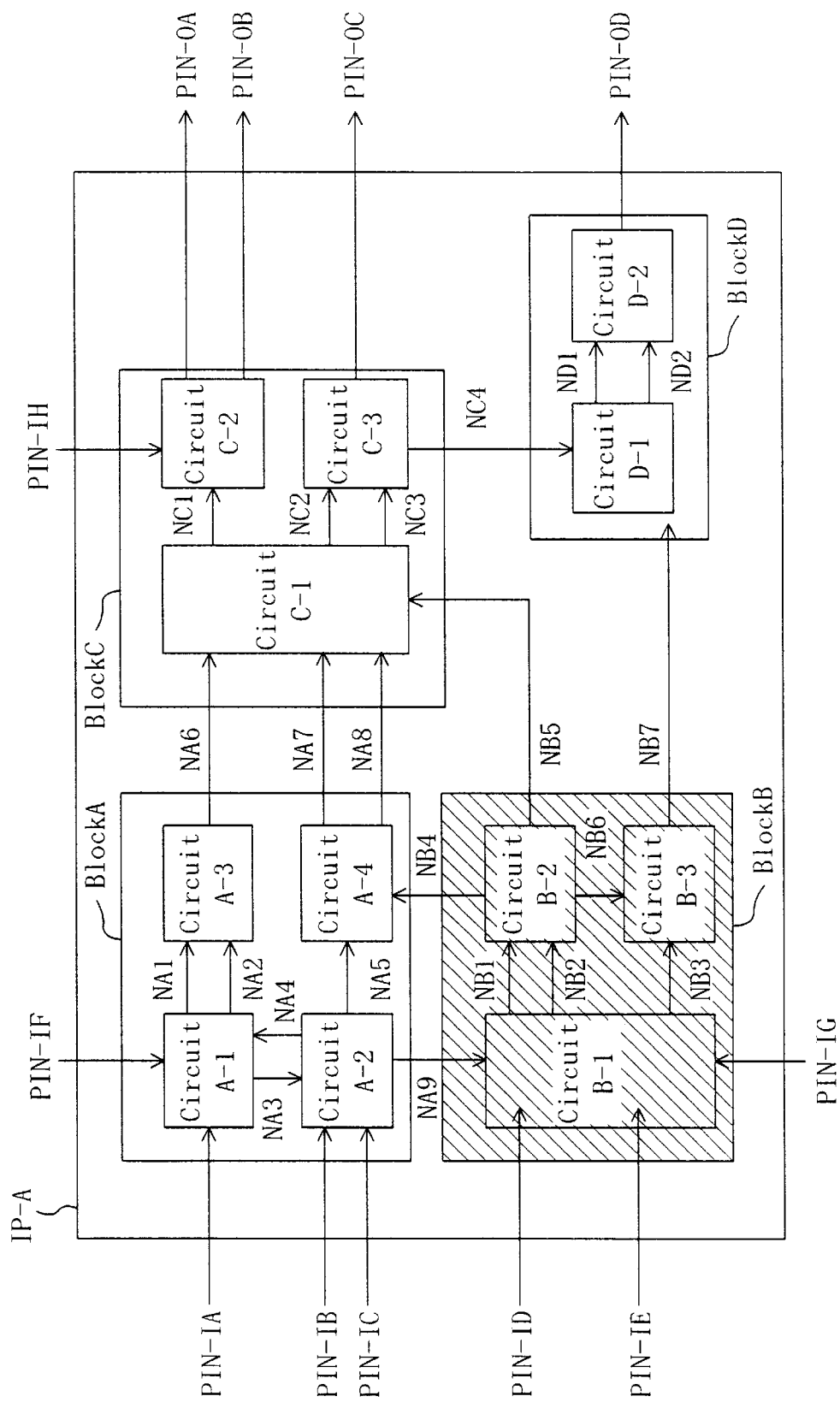
FIG. 28 shows the state in which a block of the IP stored in the design database has been selected as a required function in a design database in a second example of the fourth embodiment.

In the present example, it is assumed that the block B (hatched portion) in the IP-A shown in FIG. 28 has been selected as a function required by another IP during the generation of a new system or reconstruction of the system and a description will be given to the procedure of the selection and to the procedure of extracting the internal nodes as the output pins in accordance with the selection.

First, the functions in accordance with the specifications are selected based on the result of analyzing the design specifications. The process is performed in Steps ST60 to ST62 shown in FIG. 25. Then, it is judged from the database whether signal input/output to and from the block B is performed as the function required of the block B by another IP via the external pin or the internal node and the input/output pins (internal nodes) are extracted on a function-by-function basis. The process corresponds to the process performed in Step ST63 shown in FIG. 25.

Figure 29:
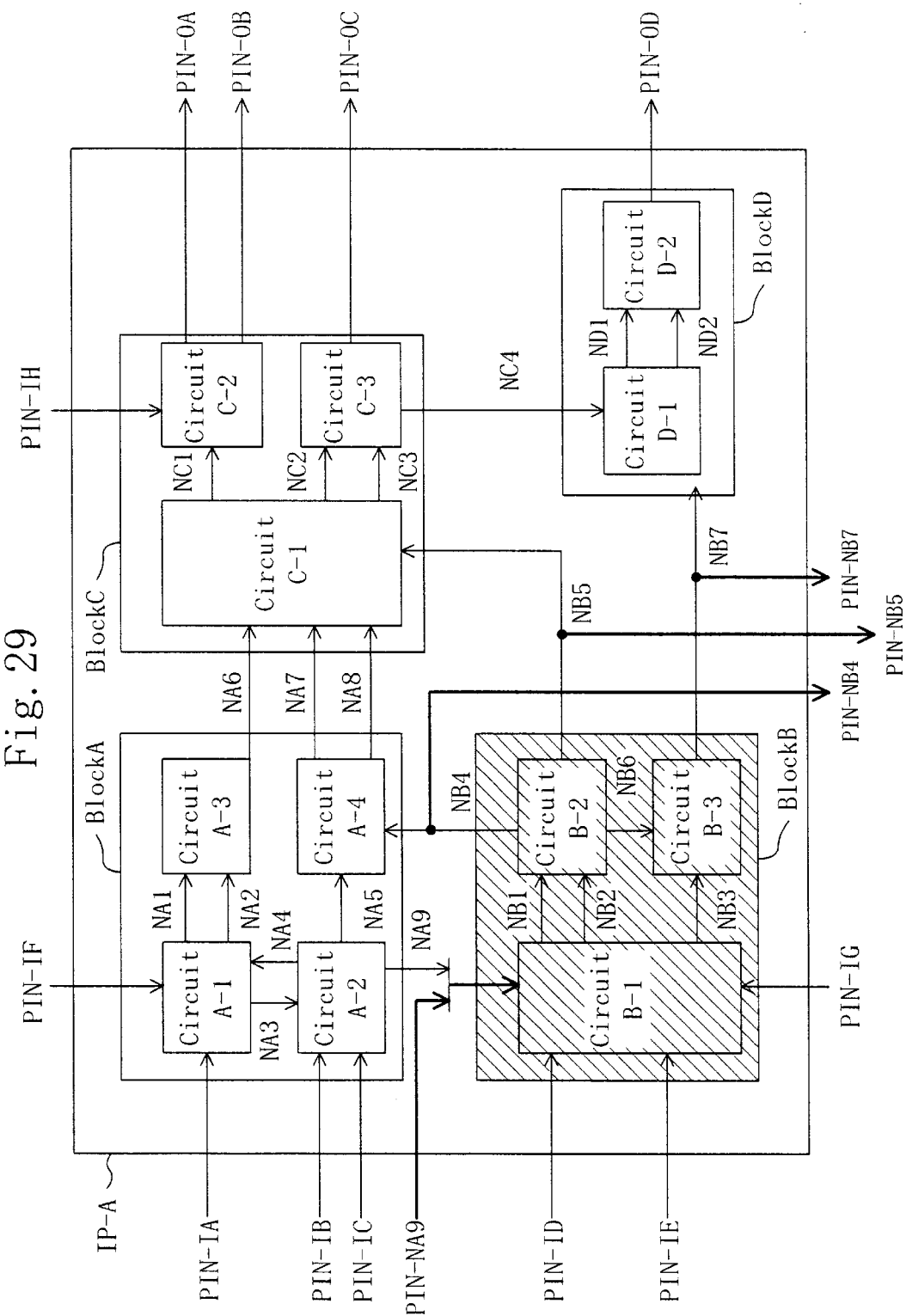
FIG. 29 shows the state in which an internal node of the block of the IP stored in the design database has been withdrawn and provided with input/output pins for use in another IP in the second example of the fourth embodiment.

Then, as shown in FIG. 29, the input pin PIN-NA9 for inputting a signal from the input-side node NA9 of the internal nodes of the block B is newly provided and the selector SEL-B1 for switching the signal inputted to the input-side node NA9 between the signal from the block A and the signal from the input pin PIN-NA9 is provided as an interface. On the other hand, the output pins PIN-NB4, PIN-NB5, and PIN-NB7 for obtaining signals from the respective output-side nodes NB4, NB5, and NB7 of the block B are provided. As for the input pins PIN-ID, PIN-ID, and PIN-IG, signals can be inputted thereto without providing new pins, similarly to the conventional structure.

According to the present example, the external pins can be withdrawn from the internal nodes by using the database storing therein even a lower-level layer such as the internal nodes including the blocks and circuits each of which is a function in the design data and IPs. With the provision of the input/output pins for inputting/outputting a signal to and from the block or circuit via the internal node, it becomes possible to use only the function (block or circuit) as a resource intended to be used for the generation of a new IP or the reconstruction of the IP, while leaving as it is the existing IP intended to be used. The method achieves remarkable effects if a new IP is to be provided in the same system. The method expands the function of the system, while suppressing an increase in the circuit area of the whole system.

In other words, only the minimum required functions can be extracted by storing the internal functions of existing design data and IPs organized in a hierarchical configuration and sequentially retrieving the functions from a lower-level layer. In this case, smooth transmission of a signal can be performed constantly between a block to be used in an IP to be used and another block disposed in the IP by providing an interface if necessary.

EXAMPLE 3

In a third example, a method of extracting some of blocks (functions) in a certain IP without considering the structure of the whole IP will be described.

In the present example also, it is assumed that the block B (hatched portion) in the IP-A shown in FIG. 30 has been selected as a function required by another IP during the generation of a new system or reconstruction of the system and a description will be given to the procedure of the selection and to the procedure of withdrawing the internal nodes as output pins in accordance with the selection.

First, functions in accordance with design specifications are selected by analyzing the specifications. The process is performed in Steps ST60 to ST62 shown in FIG. 25. Then, input/output pins (internal nodes) are extracted on a function-by-function basis. The process corresponds to the process performed in Step ST shown in FIG. 25.

Then, as shown in FIG. 30, the input pin PIN-NA9 for inputting a signal from the input-side node NA9 of the internal nodes of the block B is newly provided. In the present embodiment, it is unnecessary to provide an interface such as a selector as provided in the second embodiment. On the other hand, the output pins PIN-NB4, PIN-NB5, PIN-NB7 for extracting signals from the respective output-side nodes NB4, NB5, and NB7 of the block B are provided. As for the input pins PIN-ID, PIN-IE, and PIN-IG, signals can be inputted without providing new pins, similarly to the conventional method.

Thus, if the internal nodes are inputted/outputted in accordance with the selected function, the specification can be satisfied by outputting the internal nodes as pins to the outside and then connecting the pins. By separating the block B and the input/output pins from an unused portion, the block B can be used as a new IP or new design data. If the extracted block is stored in the database, it is stored by redefining the originally internal nodes as external pins. In the case where a new IP or new design data is composed of a large number of blocks also, the block B can be stored as one block in the new IP or design data.

According to the present example, the external pins can be withdrawn from the internal nodes by using the database storing therein even a lower-level layer such as the internal nodes including the blocks and circuits each of which is a function in the design data and IPs. With the provision of the input/output pins for inputting/outputting a signal to and from the block or circuit via the internal node, it becomes possible to extract, from the existing IPs, only the function (block or circuit) as a resource intended to be used and use the extracted function for the generation of a new IP or the reconstruction of the IP to be designed.

In other words, only the minimum required functions can be extracted by storing the internal functions of existing design data and IPs organized in a hierarchical configuration and sequentially retrieving the functions from a lower-level layer.

EXAMPLE 4

In the present example, a method of generating a new IP by using the function of only a part of the existing IPs in accordance with the method of the second or third example will be described by comparison with the conventional method.

SPECIFIC EXAMPLE 1

Figure 31B:
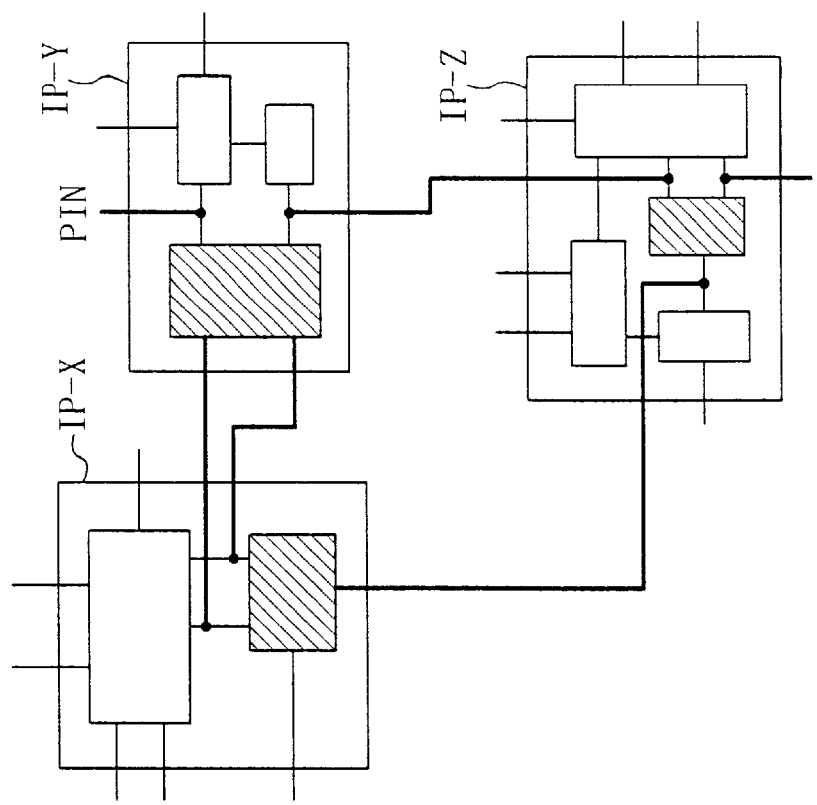
FIGS. 31(a) and 31(b) show the respective structures of existing IPs in accordance with a conventional method and of IPs in a first specific example of the third example of the fourth embodiment.
Figure 31A:
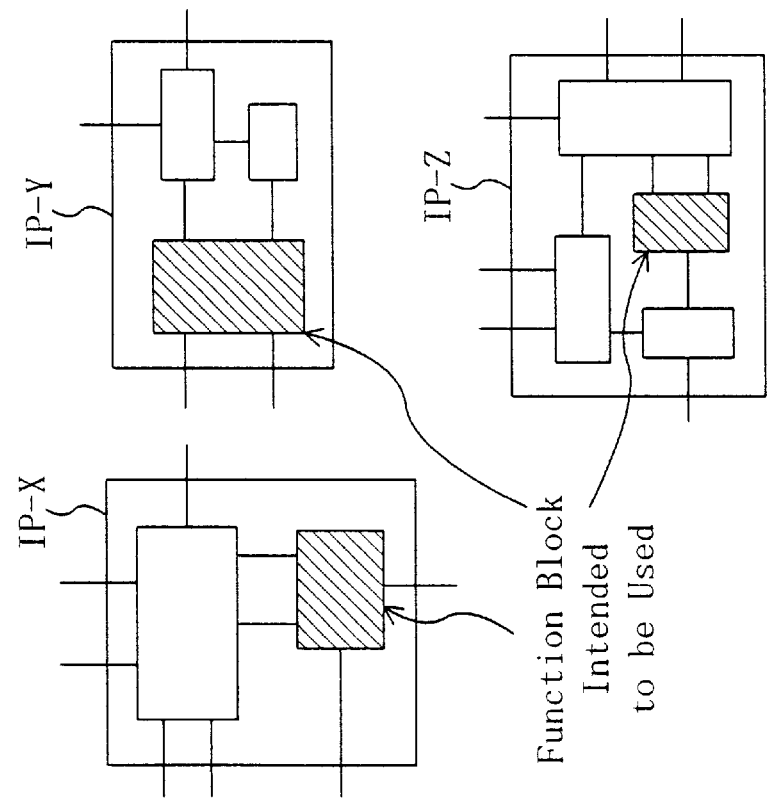

FIGS. 31(a) and 31(b) show the respective structures of the existing IPs in the conventional method and of IPs in a first specific example.

As shown in FIG. 31(a), when there are three IPs of IP-X, IP-Y, and IP-Z, it has conventionally been impossible to transmit a signal between the functions in the existing IPs to be used and a new IP to be designed even if each of the IPs contains a function (hatched portion) intended to be used. This is because only the transmission of a signal to and from the external pin of each of the IPs has been possible in the conventional method.

In the present specific example, by contrast, the internal node of each of the IPs can be retrieved from the lower-level layer of the database by using the method of the second example, as shown in FIG. 31(b), which allows easy generation of signal lines and input/output pins for obtaining a signal from the extracted internal node. By individually using the functions in the individual IPs, a new IP and design data can be generated. Since the IP to be used can be left as it is, it may be said that the method is suitable for expanding the system function and the like.

SPECIFIC EXAMPLE 2

Figure 32B:
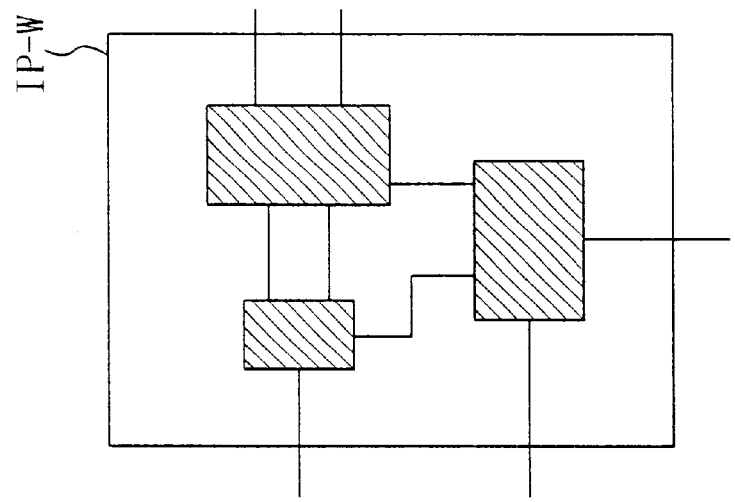
FIGS. 32(a) and 32(b) show the respective structures of existing IPs in accordance with the conventional method and of IPs in a third specific example of the third example of the fourth embodiment.
Figure 32A:
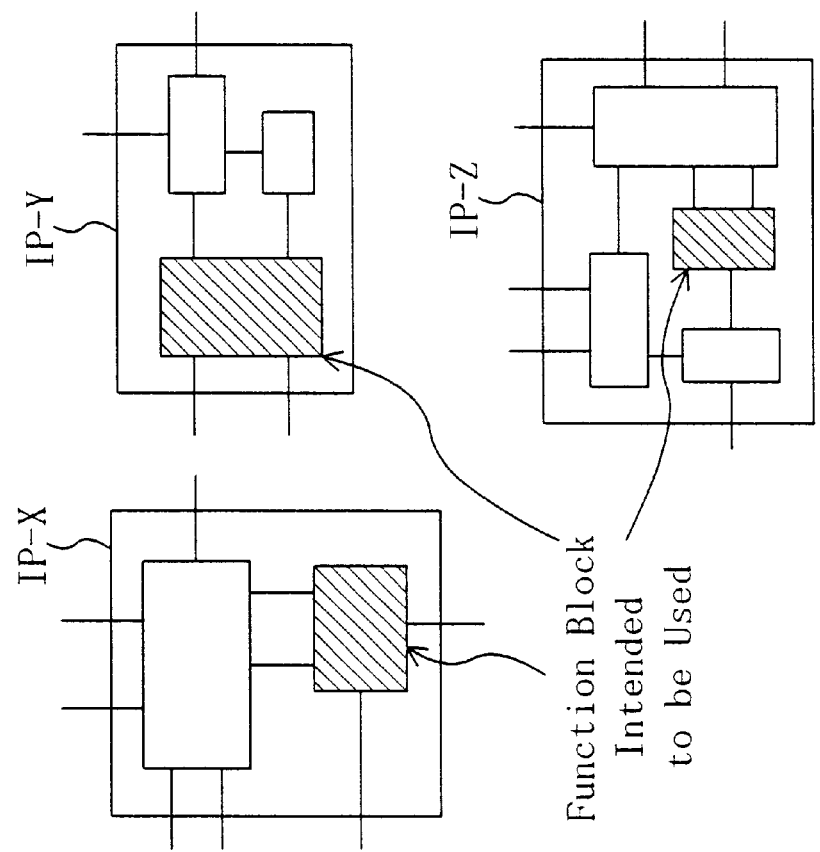

FIGS. 32(a) and 32(b) show the respective structures of the existing IPs in the conventional method and of a new IP generated in a second specific example.

As shown in FIG. 32(a), when there are three items of IP-X, IP-Y, and IP-Z, it has conventionally been difficult to extract the function of only a part of the existing IPs to be used even if each of the IPs contains a function (hatched portion) intended to be used.

In the present specific example, by contrast, the internal node of each of the IPs can be retrieved from the lower-level layer of the database by using the method of the third example, as shown in FIG. 32(b), which allows easy generation of signal lines and input/output pins for obtaining a signal from the extracted internal node. Then, a new IP-W (or design data) can be generated by building the functions in the individual IPs.

SPECIFIC EXAMPLE 3

Figure 33B:
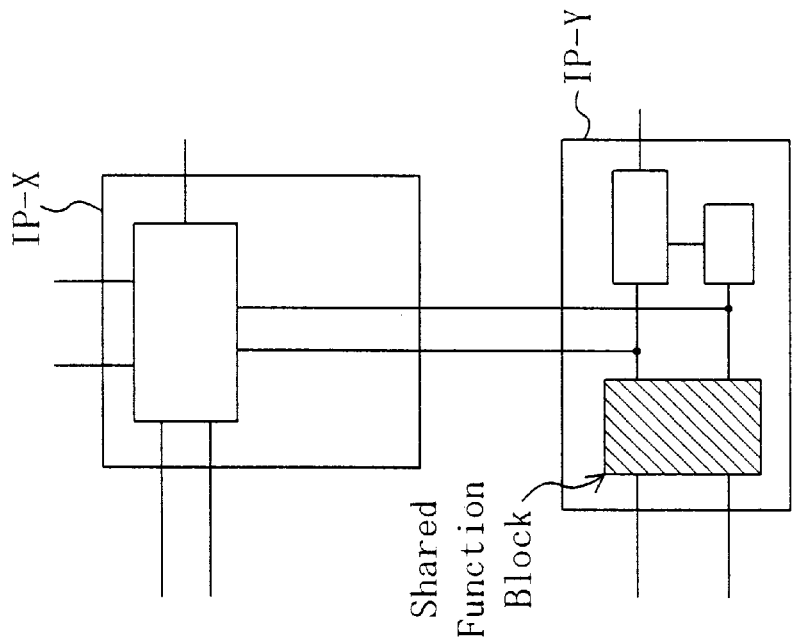
FIGS. 33(a) and 33(b) show the respective structures of existing IPs in accordance with the conventional method and of IPs in a third specific example of the third example of the fourth embodiment.
Figure 33A:
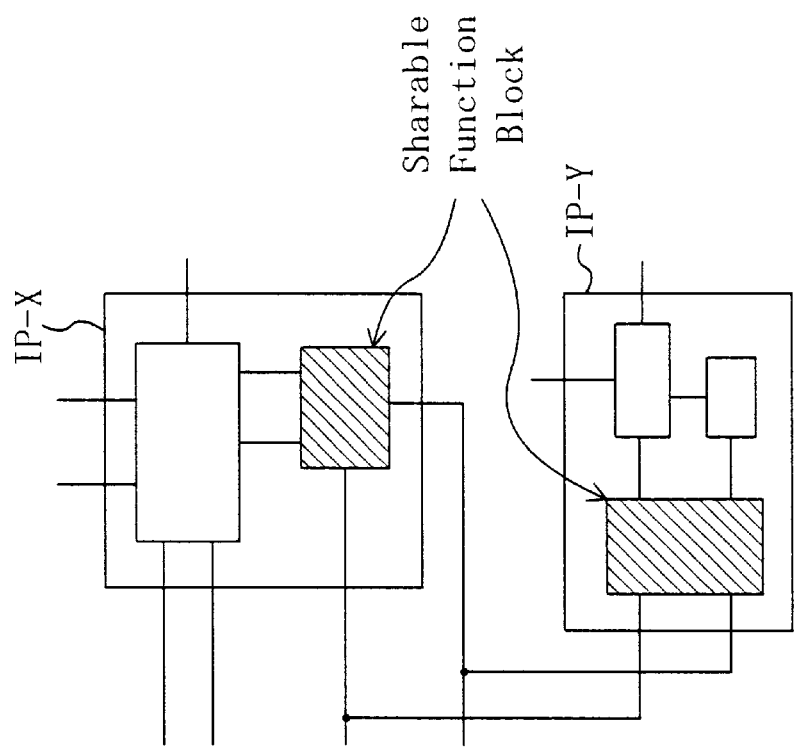

FIGS. 33(a) and 33(b) show the respective structures of the existing IPs in the conventional method and of IPs reconstructed in a third specific example.

When there are two IPs of IP-X and IP-Y as shown in FIG. 33(a), if the individual IPs have common functions (hatched portions), it has conventionally been difficult to share at least one of the common functions between the individual IPs.

In the present specific example, by contrast, the internal node of each of the IPs can be retrieved from the lower-level layer of the database by using the method of the second example, as shown in FIG. 33(b), which allows easy generation of signal lines and input/output pins for obtaining a signal from the extracted internal node. Then, the function of concern is deleted from the IP-X such that one function is shared between the IP-X and the IP-Y.

Since the processes in the individual examples and specific examples of the present embodiment can be performed nearly automatically without depending on the skillfulness of the designer, they allow a reduction in design period even when a large-scale system is to be constructed and an improvement in the quality of the designed semiconductor integrated circuit device.

What is claimed is:

1. A method of designing a semiconductor integrated circuit device by using a database storing therein data on a plurality of circuits having different parameters, the method comprising the steps of:

(a) inputting specifications required of the semiconductor integrated circuit device;

(b) inputting data on the plurality of circuits stored in the database and automatically analyzing the parameters of the circuits; and (c) automatically designing the semiconductor integrated circuit device in accordance with a result of the analysis to satisfy the required specifications, wherein the parameters are scales of the plurality of circuits, the step (a) includes inputting constraints on a circuit area or a number of gates of the semiconductor integrated circuit device to be detected, and the step (b) includes analyzing a combination of circuits to be embedded in the semiconductor integrated circuit device and sharability of a pad between the circuits, while holding the circuit area or number of gates of the semiconductor integrated circuit device within the constraints.

* * * * *